(12) United States Patent
Yamashita et al.

(10) Patent No.: US 7,258,462 B2
(45) Date of Patent: Aug. 21, 2007

(54) BACKLIGHT UNIT INCLUDING CURVED FLUORESCENT LAMP, AND LIQUID CRYSTAL DISPLAY APPARATUS INCLUDING THE BACKLIGHT UNIT

(75) Inventors: Hirofumi Yamashita, Moriguchi (JP);
Toshihiro Terada, Amagasaki (JP);
Takashi Maniwa, Takatsuki (JP);
Yusuke Mori, Fukuchiyama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 97 days.

(21) Appl. No.: 11/112,045

(22) Filed: Apr. 22, 2005

(65) Prior Publication Data

US 2005/0243548 A1 Nov. 3, 2005

(30) Foreign Application Priority Data

Apr. 23, 2004 (JP) .............................. 2004-128904

(51) Int. Cl.
*F21S 4/00* (2006.01)
(52) U.S. Cl. ...................... 362/225; 362/216; 362/614; 362/618
(58) Field of Classification Search ................ 362/225, 362/614, 618, 216
See application file for complete search history.

(56) References Cited

U.S. PATENT DOCUMENTS 6,050,704 A * 4/2000 Park ........................... 362/260

6,808,302 B2 * 10/2004 Miyamoto ................... 362/580
2003/0142487 A1 * 7/2003 Fan .............................. 362/29
2004/0012971 A1 * 1/2004 Tsai et al. .................... 362/390
2004/0051454 A1 * 3/2004 Sauska et al. ............... 313/567

FOREIGN PATENT DOCUMENTS

| JP | 07-270786 | 10/1995 |
| JP | 2002-214605 | 7/2002 |
| JP | 2004-171975 | 6/2004 |

* cited by examiner

*Primary Examiner*—Renee Luebke
*Assistant Examiner*—Jessica L McMillan

(57) ABSTRACT

A backlight unit that includes: an outer container; a curved fluorescent lamp that is contained in the outer container and includes two electrodes and a glass bulb that has (i) a folded portion and (ii) two straight portions that extend in parallel with each other from the folded portion, and the two electrodes being respectively attached to two ends of the glass bulb; and an inverter operable to supply power for lighting to the curved fluorescent lamp. The inverter is disposed outside the outer container, and the curved fluorescent lamp is arranged so that the electrodes are at low positions and the folded portion is at a high position in the outer container when the backlight unit is erected vertically in use.

7 Claims, 25 Drawing Sheets

STRAIGHT-TUBE TRANSVERSE-MOUNTED TYPE

CURVED-TUBE TRANSVERSE-MOUNTED TYPE

STRAIGHT-TUBE VERTICAL-MOUNTED TYPE

CURVED-TUBE VERTICAL-MOUNTED TYPE

FIG.6

| MEASUREMENT POINT | <1> <17> | <2> <16> | <3> <15> | <4> <14> | <5> <13> | <6> <12> | <7> <11> | <8> <10> | <9> |
|---|---|---|---|---|---|---|---|---|---|
| POSITION | ELECTRODE CENTER | 48 | 96 | 144 | 193 | 240 | 289 | 337 | FOLDED PORTION CENTER |

[UNIT: mm]

FIG.7

| MEASUREMENT POINT | <1> | <2> | <3> | <4> | <5> | <6> | <7> | <8> | <9> |
|---|---|---|---|---|---|---|---|---|---|
| TEMPERATURE | 79.9 | 53.6 | 54.4 | 56.7 | 56.5 | 57.2 | 54.0 | 54.5 | 47.5 |
| MEASUREMENT POINT | <17> | <16> | <15> | <14> | <13> | <12> | <11> | <10> | |
| TEMPERATURE | 81.9 | 54.5 | 53.6 | 54.7 | 54.9 | 56.6 | 54.4 | 53.7 | |

[UNIT: °C]

FIG.8

| MEASUREMENT POINT | <1> | <2> | <3> | <4> | <5> | <6> | <7> | <8> | <9> |
|---|---|---|---|---|---|---|---|---|---|
| TEMPERATURE | 79.9 | 63.6 | 64.4 | 66.7 | 66.5 | 67.2 | 64.0 | 64.5 | 65.0 |
| MEASUREMENT POINT | <17> | <16> | <15> | <14> | <13> | <12> | <11> | <10> | |
| TEMPERATURE | 81.9 | 64.5 | 63.6 | 64.7 | 64.9 | 66.6 | 64.4 | 63.7 | |

[UNIT: °C]

FIG.13

| TYPE | Ne | Ar | Kr | GAS PRESSURE (Torr) | No. | 0°C STARTING VOLTAGE | 25°C STARTING VOLTAGE |
|---|---|---|---|---|---|---|---|
| A | 95 | 5 | | 40 | 1 | 1310 | 1058 |
| | | | | | 2 | 1294 | 1048 |
| | | | | | 3 | 1304 | 1063 |
| | | | | | 4 | 1286 | 1038 |
| | | | | | 5 | 1286 | 1034 |
| | | | | 50 | 1 | 1404 | 1152 |
| | | | | | 2 | 1399 | 1144 |
| | | | | | 3 | 1385 | 1132 |
| | | | | | 4 | 1409 | 1148 |
| | | | | | 5 | 1386 | 1122 |
| | | | | 60 | 1 | 1516 | 1197 |
| | | | | | 2 | 1530 | 1220 |
| | | | | | 3 | 1476 | 1218 |
| | | | | | 4 | 1492 | 1225 |
| | | | | | 5 | 1478 | 1214 |

FIG.14

| TYPE | Ne | Ar | Kr | GAS PRESSURE (Torr) | No. | 0°C STARTING VOLTAGE | 25°C STARTING VOLTAGE |
|---|---|---|---|---|---|---|---|
| B-1 | 95 | 2 | 3 | 40 | 1 | 1220 | 1041 |
| | | | | | 2 | 1225 | 1050 |
| | | | | | 3 | 1203 | 1028 |
| | | | | | 4 | 1230 | 1055 |
| | | | | | 5 | 1218 | 1045 |
| | | | | 50 | 1 | 1314 | 1149 |
| | | | | | 2 | 1304 | 1138 |
| | | | | | 3 | 1300 | 1141 |
| | | | | | 4 | 1297 | 1131 |
| | | | | | 5 | 1320 | 1153 |
| | | | | 60 | 1 | 1341 | 1180 |
| | | | | | 2 | 1345 | 1179 |
| | | | | | 3 | 1342 | 1186 |
| | | | | | 4 | 1342 | 1179 |
| | | | | | 5 | 1344 | 1177 |

FIG.15

| TYPE | Ne | Ar | Kr | GAS PRESSURE (Torr) | No. | 0°C STARTING VOLTAGE | 25°C STARTING VOLTAGE |
|---|---|---|---|---|---|---|---|
| B-2 | 95 | 4 | 1 | 40 | 1 | 1290 | 1103 |
| | | | | | 2 | 1286 | 1098 |
| | | | | | 3 | 1287 | 1103 |
| | | | | | 4 | 1296 | 1104 |
| | | | | | 5 | 1285 | 1097 |
| | | | | 50 | 1 | 1349 | 1165 |
| | | | | | 2 | 1362 | 1191 |
| | | | | | 3 | 1362 | 1179 |
| | | | | | 4 | 1371 | 1180 |
| | | | | | 5 | 1356 | 1180 |
| | | | | 60 | 1 | 1409 | 1228 |
| | | | | | 2 | 1411 | 1228 |
| | | | | | 3 | 1423 | 1235 |
| | | | | | 4 | 1417 | 1227 |
| | | | | | 5 | 1423 | 1244 |

FIG.16

| TYPE | Ne | Ar | Kr | GAS PRESSURE (Torr) | No. | 0°C STARTING VOLTAGE | 25°C STARTING VOLTAGE |
|---|---|---|---|---|---|---|---|
| B-3 | 94.5 | 5 | 0.5 | 40 | 1 | 1276 | 1089 |
| | | | | | 2 | 1252 | 1076 |
| | | | | | 3 | 1239 | 1072 |
| | | | | | 4 | 1244 | 1059 |
| | | | | | 5 | 1266 | 1079 |
| | | | | 50 | 1 | 1352 | 1173 |
| | | | | | 2 | 1314 | 1134 |
| | | | | | 3 | 1331 | 1155 |
| | | | | | 4 | 1328 | 1149 |
| | | | | | 5 | 1316 | 1134 |
| | | | | 60 | 1 | 1400 | 1225 |
| | | | | | 2 | 1427 | 1239 |
| | | | | | 3 | 1404 | 1228 |
| | | | | | 4 | 1434 | 1256 |
| | | | | | 5 | 1417 | 1239 |

FIG.17

| TYPE | Ne | Ar | Kr | GAS PRESSURE (Torr) | No. | 0°C STARTING VOLTAGE | 25°C STARTING VOLTAGE |
|---|---|---|---|---|---|---|---|
| B-4 | 93 | 5 | 2 | 40 | 1 | 1263 | 1076 |
| | | | | | 2 | 1277 | 1097 |
| | | | | | 3 | 1270 | 1079 |
| | | | | | 4 | 1266 | 1077 |
| | | | | | 5 | 1258 | 1077 |
| | | | | 50 | 1 | 1345 | 1170 |
| | | | | | 2 | 1376 | 1201 |
| | | | | | 3 | 1369 | 1191 |
| | | | | | 4 | 1387 | 1206 |
| | | | | | 5 | 1361 | 1183 |
| | | | | 60 | 1 | 1411 | 1232 |
| | | | | | 2 | 1400 | 1228 |
| | | | | | 3 | 1392 | 1210 |
| | | | | | 4 | 1397 | 1222 |
| | | | | | 5 | 1400 | 1220 |

FIG.18

| TYPE | Ne | Ar | Kr | GAS PRESSURE (Torr) | No. | 0°C STARTING VOLTAGE | 25°C STARTING VOLTAGE |
|---|---|---|---|---|---|---|---|
| B-5 | 90 | 5 | 5 | 40 | 1 | 1215 | 1048 |
| | | | | | 2 | 1246 | 1072 |
| | | | | | 3 | 1215 | 1048 |
| | | | | | 4 | 1245 | 1073 |
| | | | | | 5 | 1230 | 1055 |
| | | | | 50 | 1 | 1308 | 1141 |
| | | | | | 2 | 1318 | 1145 |
| | | | | | 3 | 1330 | 1156 |
| | | | | | 4 | 1323 | 1153 |
| | | | | | 5 | 1316 | 1141 |
| | | | | 60 | 1 | 1427 | 1258 |
| | | | | | 2 | 1399 | 1232 |
| | | | | | 3 | 1407 | 1238 |
| | | | | | 4 | 1427 | 1249 |
| | | | | | 5 | 1423 | 1259 |

FIG.21

| TYPE | Ne | Ar | Kr | GAS PRESSURE (Torr) | No. | 0°C STARTING VOLTAGE | 25°C STARTING VOLTAGE |
|---|---|---|---|---|---|---|---|
| C | 95 | | 5 | 40 | 1 | 1169 | 1019 |
| | | | | | 2 | 1201 | 1053 |
| | | | | | 3 | 1173 | 1022 |
| | | | | | 4 | 1172 | 1014 |
| | | | | | 5 | 1172 | 1019 |
| | | | | 50 | 1 | 1239 | 1111 |
| | | | | | 2 | 1231 | 1087 |
| | | | | | 3 | 1246 | 1101 |
| | | | | | 4 | 1246 | 1103 |
| | | | | | 5 | 1244 | 1097 |
| | | | | 60 | 1 | 1303 | 1172 |
| | | | | | 2 | 1323 | 1187 |
| | | | | | 3 | 1289 | 1146 |
| | | | | | 4 | 1301 | 1169 |
| | | | | | 5 | 1306 | 1167 |

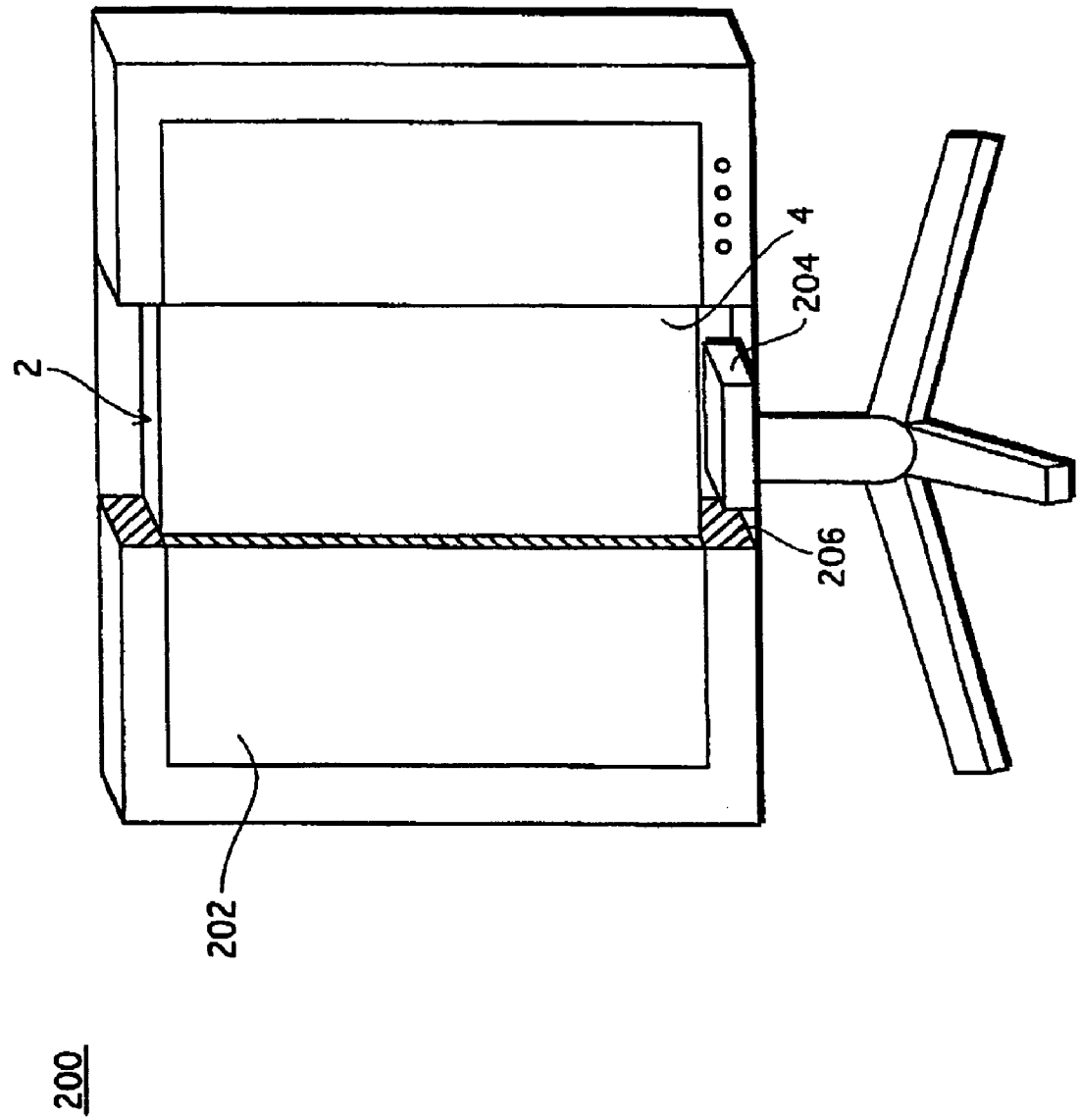

BACKLIGHT UNIT INCLUDING CURVED FLUORESCENT LAMP, AND LIQUID CRYSTAL DISPLAY APPARATUS INCLUDING THE BACKLIGHT UNIT

This application is based on an application No. 2004-128940 filed in Japan, the contents of which are hereby incorporated by reference.

BACKGROUND OF THE INVENTION (1) Field of the Invention

The present invention relates to a backlight unit and a LCD (Liquid Crystal Display) apparatus, especially to a backlight unit which is disposed at the back of a LCD panel to constitute a LCD apparatus, and to the LCD apparatus including the backlight unit.

(2) Description of the Related Art

In recent years, as the LCD apparatuses have started to be employed in liquid crystal televisions or the like in full scale, the demand for the backlight units, which are mounted in the LCD apparatuses, has increased as well.

Backlight units are classified into two types: an edge-light type (also referred to as a side-light type or an optical waveguide type) in which an optical waveguide is disposed on the back surface of a LCD panel, and fluorescent lamps are arranged at the edges of the optical waveguide; and a direct-below type in which a plurality of fluorescent lamps are arranged on the back surface of a LCD panel to be in parallel with the back surface. In general, edge-light type backlight units are advantageous in achieving a thin body and even brightness on the light-emitting surface, but are disadvantageous in achieving high brightness, and the direct-below-type backlight units are advantageous in achieving high brightness, but are disadvantageous in achieving a thin body.

Accordingly, LCD apparatuses for liquid crystal televisions, which put weight on achieving high brightness, often adopt the direct-below-type backlight unit.

A direct-below-type backlight unit has a reflection plate, which is in a rectangular shape that corresponds to a horizontally wide screen of the liquid crystal television, and a translucent plate that includes an optical diffusion plate, the plates being arranged in parallel with each other. The direct-below-type backlight unit also has a plurality of fluorescent lamps that are arranged between the reflection plate and the translucent plate, and lets light, which is emitted from the fluorescent lamps, pass through the translucent plate toward the LCD panel. With such a construction, the LCD panel receives light at its back from the backlight unit. The four sides of the backlight unit between the reflection plate and the translucent plate, in which the fluorescent lamps are arranged, are closed by side plates or the like to prevent dusts or the like from entering into the backlight unit (see, for example, Japanese Laid-Open Patent Application No. 2002-214605).

In regards with the backlight unit having the above-described construction, many types of backlight units, which are different in the shape or layout of the fluorescent lamps, have been put into practical use. Such backlight units include: a backlight unit in which straight-tube fluorescent lamps are laid horizontally with regular intervals in the vertical direction (hereinafter, the backlight unit is referred to as a straight-tube transverse-mounted type); a backlight unit in which straight-tube fluorescent lamps are erected vertically with regular intervals in the horizontal direction (hereinafter, the backlight unit is referred to as a straight-tube vertical-mounted type—see the above-mentioned Japanese Laid-Open Patent Application No. 2002-214605); and a backlight unit in which fluorescent lamps curved into the shape of character "U" are laid horizontally with regular intervals in the vertical direction (hereinafter, the backlight unit is referred to as a curved-tube transverse-mounted type—see Japanese Laid-Open Patent Application No. 7-270786).

Meanwhile, as the liquid crystal television are becoming larger in size and higher in brightness, the number of fluorescent lamps per direct-below type backlight unit to be attached to a LCD panel for a liquid crystal television is increasing. As the number of fluorescent lamps increases, the temperature in the backlight unit increases. This causes the temperature distribution in the backlight unit to be more uneven. In general, the liquid crystal televisions with horizontally wide screens are erected vertically in use. As a result, the upper portion of the backlight unit has a higher temperature, and the lower portion has a lower temperature.

In the transverse-mounted type backlight units in the above-described cases, the brightness is higher at a fluorescent lamp arranged at a higher position, and is lower at a fluorescent lamp arranged at a lower position. This makes a difference in brightness between fluorescent lamps and causes uneven brightness in the overall backlight unit. In the case of the straight-tube vertical-mounted type, there is hardly a difference in brightness between the lamps, but the brightness is higher at higher portions and is lower at lower portions of each lamp. This causes uneven brightness in the overall backlight unit.

SUMMARY OF THE INVENTION

The first object of the present invention is therefore to provide a backlight unit in which the unevenness in brightness has been restricted more than in conventional ones.

The second object of the present invention is to provide a liquid crystal display apparatus including such a backlight unit.

The first object is fulfilled by a backlight unit comprising: an outer container; a curved fluorescent lamp that is contained in the outer container and includes two electrodes and a glass bulb that has (i) a folded portion and (ii) two straight portions that extend in parallel with each other from the folded portion, and the two electrodes being respectively attached to two ends of the glass bulb; and an inverter operable to supply power for lighting to the curved fluorescent lamp, wherein the inverter is disposed outside the outer container, and the curved fluorescent lamp is arranged so that the electrodes are at low positions and the folded portion is at a high position in the outer container when the backlight unit is erected vertically in use.

With the above-stated construction in which the curved fluorescent lamp is arranged so that the electrodes are at low positions and the folded portion is at a high position in the outer container when the backlight unit is erected vertically in use, the heat generated by the electrodes, which are the main heat source, flows upwards in the glass bulb, and most of the heat is used to heat a rare gas that is usually filled in the glass bulb. When this happens, the gas (the air) filling the backlight unit is not heated as much as in conventional backlight units. This restricts the temperature rise in the backlight unit, and reduces the unevenness in temperature distribution in the backlight unit in the vertical direction. This construction, therefore, restricts the unevenness in brightness in the backlight unit, which is caused by the unevenness in temperature distribution.

Also, in the above-stated construction, the inverter, which is a meaning less heat source, is disposed outside the outer container. This restricts the unevenness in brightness in the overall backlight unit, which is caused by the unevenness in temperature due to the presence of the inverter in the outer container.

The second object is fulfilled by a liquid crystal display apparatus comprising: a liquid crystal display panel; and the backlight unit defined in claim 1, wherein the outer container is disposed on a back surface of the liquid crystal display panel.

With the above-stated construction, an image that is less uneven is formed on the liquid crystal display panel.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 6 shows positions of the temperature measurement points in the experiment model;

FIG. 7 shows the temperature measurement results when the experiment model was lighted outside the backlight unit;

FIG. 8 shows the temperature measurement results when the experiment model was lighted inside the backlight unit;

FIG. 11A is a plot of mix ratio between neon and argon versus starting voltage, and FIG. 11B is a plot of mix ratio between neon and argon versus lamp efficiency;

FIG. 13 shows starting voltage values measured for each of the ambient temperatures 0° C. and 25° C. for varied mix gas pressure in the cold-cathode fluorescent lamp which was filled with a mix gas having a predetermined mix ratio of neon gas and argon gas;

FIG. 14 shows starting voltage values measured for each of the ambient temperatures 0° C. and 25° C. for varied mix gas pressure in the cold-cathode fluorescent lamp which was filled with a mix gas having a predetermined mix ratio of neon gas, argon gas, and krypton gas;

FIG. 15 shows starting voltage values measured for each of the ambient temperatures 0° C. and 25° C. for varied mix gas pressure in the cold-cathode fluorescent lamp which was filled with a mix gas having a predetermined mix ratio of neon gas, argon gas, and krypton gas;

FIG. 16 shows results of the same item measured in the same condition as FIG. 15 in the cold-cathode fluorescent lamp which was filled with a mix gas having a different mix ratio from that of FIG. 15;

FIG. 17 shows results of the same item measured in the same condition as FIG. 15 in the cold-cathode fluorescent lamp which was filled with a mix gas having a different mix ratio from that of FIG. 15;

FIG. 18 shows results of the same item measured in the same condition as FIG. 15 in the cold-cathode fluorescent lamp which was filled with a mix gas having a different mix ratio from that of FIG. 15;

FIG. 21 shows starting voltage values measured for each of the ambient temperatures 0° C. and 25° C., for varied mix gas pressure in the cold-cathode fluorescent lamp which was filled with a mix gas having a predetermined mix ratio of neon gas and krypton gas;

FIG. 25 shows an outline of a liquid crystal television in which the backlight unit in the embodiment is used.

DESCRIPTION OF THE PREFERRED EMBODIMENT

Figure 1:
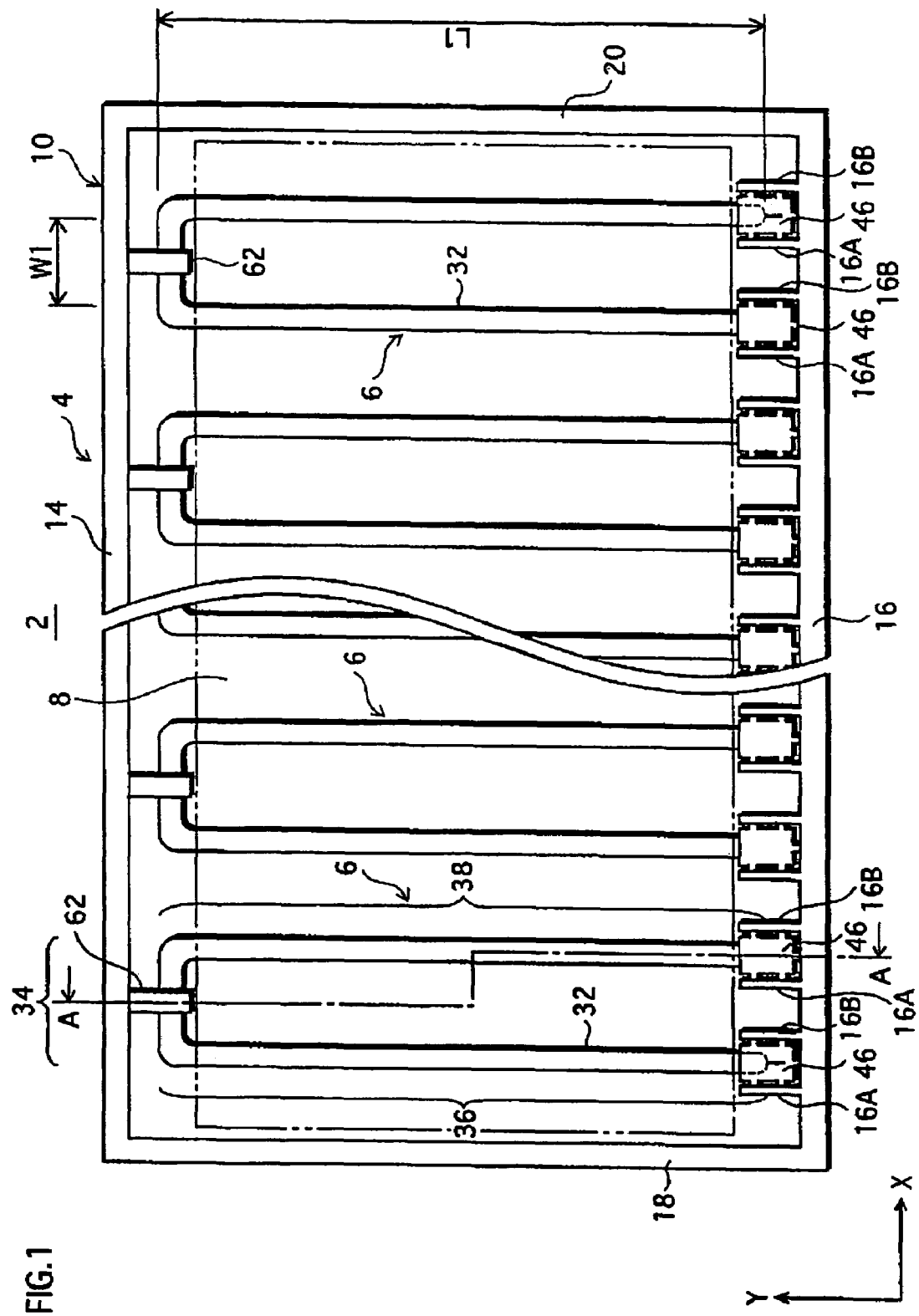
FIG. 1 is a plan view of the back light unit in the embodiment (in which the optical waveguide or the like is omitted)
Figure 2A:
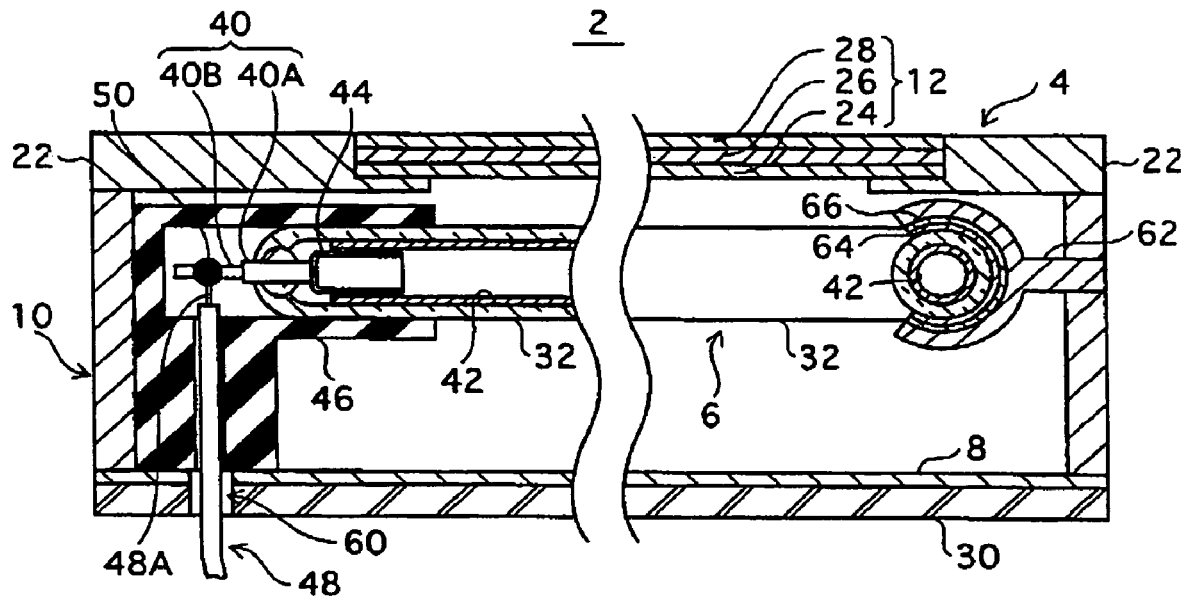
FIG. 2A is a sectional view taken along line A-A of FIG. 1.

FIG. 1 is a plan view showing the construction of a direct-below type backlight unit 2 in Embodiment 1. FIG. 2A is a sectional view taken along line A-A of FIG. 1. It should be noted here that in FIG. 1, a translucent plate 12 and an attachment frame 22 to which the translucent plate 12 is attached, which will be described later, are omitted. The backlight unit 2 is disposed at the back of a LCD (Liquid Crystal Display) panel (not illustrated) for use and constitutes a LCD apparatus that is to be a display unit of a liquid crystal television.

The construction of the backlight unit 2 will be described with reference to FIGS. 1 and 2A.

The backlight unit 2 includes an outer container 4, which is in the shape of a flat box, and a plurality of curved cold-cathode fluorescent lamps 6 (hereinafter referred to as merely "fluorescent lamps 6") contained in the outer container 4. When the backlight unit 2 constitutes a liquid crystal television or the like, the X axis in FIG. 1 indicates a horizontal direction, and the Y axis indicates a vertical direction. In the following description of the present application, the X axis direction indicates a transverse direction or a horizontal direction, and the Y axis direction indicates a vertical direction.

The outer container 4 is basically composed of: a reflection plate 8 that is in the shape of a horizontally wide rectangle; a side plate 10 that is disposed at the rim of the reflection plate 8; and a translucent plate 12 disposed in parallel with the reflection plate 8. Here, it is supposed that the sides of the side plate 10, which appears to be a rectangular frame in a plan view, are referred to as an upper portion 14, a lower portion 16, a left portion 18, and a right portion 20, respectively, as shown in FIG. 1. The translucent plate 12 is fit into the attachment frame 22 that is attached to the side plate 10. The attachment frame 22 is made of a material that does not transmit light. Accordingly, the light emitted from the fluorescent lamps 6 is extracted only from an area corresponding to the translucent plate 12, that is to say, the area surrounded by the chain double-dashed line in FIG. 1.

The translucent plate 12 is a laminate of an optical diffusion plate 24, an optical diffusion sheet 26, and a lens sheet 28 that are disposed in the stated order from the reflection plate 8 (from the fluorescent lamps 6).

The reflection plate 8 is reinforced by a metal plate 30 that is stuck thereto.

A plurality of pairs of ribs 16A and 16B are formed inside the lower portion 16 of the side plate 10 to project vertically inward, with regular intervals in the horizontal direction. The ribs 16A and 16B are provided to support the fluorescent lamps 6 at their ends, which will be described later.

The following describes the construction of the fluorescent lamps 6.

Each fluorescent lamp 6 includes a glass bulb 32. The glass bulb 32 has a folded portion 34 at which a glass tube, which is circular in the cross section, is folded. The glass bulb 32 also has straight portions 110 and 112 that extend from two ends of the folded portion 34 in parallel with each other. The ends of the straight portions 110 and 112 are hermetically sealed.

The glass bulb 32 is in the shape of character "U" as shown in FIG. 1. The glass bulb 32 is made of hard borosilicate glass. The ends of the glass bulb 32 are hermetically sealed with lead wires 40, as shown in FIG. 2A.

The inner surface of the glass bulb 32 is coated with a fluorescent substance film 42. The fluorescent substance film 42 includes three rare-earth fluorescent substances: red fluorescent substance $[Y_2O_3:Eu^{3+}]$; green fluorescent substance $[LaPO_4:Ce^{3+}, Tb^{3+}]$; and blue fluorescent substance $[BaMg_2Al_{16}O_{27}:Eu^{2+}]$. To improve the color rendition, these fluorescent substances may be replaced with purer spectral color fluorescent substances. In such a case, replacing the green fluorescent substance with a purer spectral green fluorescent substance produces the highest effect in improving the color rendition. The purer spectral green fluorescent substance may be selected from: $[BaMg_2Al_{16}O_{27}:Eu^{2+}, Mn^{2+}]$, $[Ce(Mg,Zn)Al_{11}O_{19}:Eu^{2+}, Mn^{2+}$ and $[CeMgAl_{11}O_{19}:Tb^{3+}, Mn^{2+}]$. To further improve the color rendition, the red fluorescent substance with a purer spectral red fluorescent substance. The purer spectral red fluorescent substance may be selected from: $[Y(P,V)O_4:Eu^{3+}]$ and $[Y_2O_2S:Eu^{3+}]$. Also, a purer spectral blue fluorescent substance may be used. The purer spectral blue fluorescent substance may be, for example, $[CaMgSi_2O_8:Eu^{2+}]$.

The glass bulb 32 contains approximately 3 mg of mercury (not illustrated) and a mix gas whose 92% is neon (Ne) and the remainder is composed of argon (Ar) and krypton (Kr). The rare gases contained in the mix gas and the mix ratio or the like are not limited to the above-described ones, but may be selected from options that will be detailed later.

The lead wire 40 is formed by linking an inner lead wire 40A made of tungsten with an outer lead wire 40B made of nickel. The glass bulb 32 is hermetically sealed with the inner lead wire 40A. Both the inner lead wire 40A and the outer lead wire 40B are circular in the cross section.

The inner lead wire 40A is supported by an end of the glass bulb 32. An electrode 44 is joined by, for example, laser welding, with an end of the inner lead wire 40A located inside the glass bulb 32. The electrode 44 is what is called hollow type which is in the shape of a cylinder with a bottom. The electrode 44 is made of a niobium bar. The reason why the hollow type is adopted for the electrode 44 is that the hollow type is effective in suppressing the sputtering at electrodes caused by the discharge when the lamp is lighted (for detail, see, for example, Japanese Laid-Open Patent Application No. 2002-289138).

A bush 46 is fit into each of the two ends of each fluorescent lamp 6. As shown in the cross section of FIG. 2A, a covered conductor 48, which is wired from an inverter 204 (not shown in FIG. 2A, see FIG. 25) being a power circuit unit, is connected to the lead wire 40. The connection of the covered conductor 48 with the lead wire 40 is made by joining a conductive wire 48A of the covered conductor 48 with the outer lead wire 40B by a solder 50 while the conductive wire 48A is wound around the outer lead wire 40B. The covered conductor 48 is drawn outside the backlight unit via a continuous hole 60 that continuously passes through the reflection plate 8 and the metal plate 60.

Figure 2B:
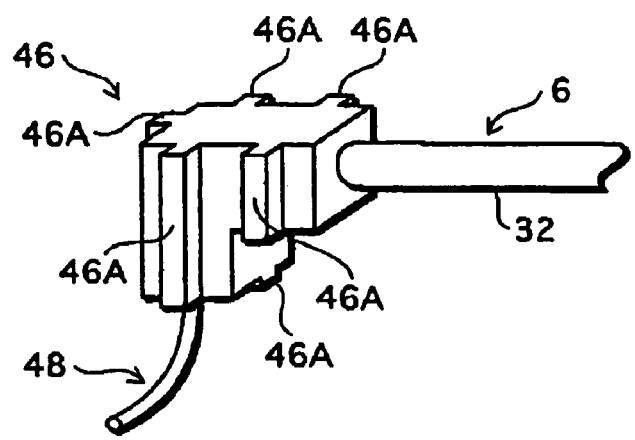
FIG. 2B is a perspective view of the bush that has been attached to the cold-cathode fluorescent lamp.

FIG. 2B is a perspective view of the bush 46 that has been attached to the fluorescent lamp 6. As shown in FIG. 2B, a plurality of ribs 46A project from outer surfaces of the bush 46. Each of the two ends of the fluorescent lamp 6 is attached to the outer container 4 via the bush 46. More specifically, as shown in FIG. 1, a bush 46 is pressed into a space between a pair of ribs 16A and 16B of the outer container 4, which causes the elastic bush 46 to be deformed. The bush 46 is then fixed firmly to the ribs 16A and 16B by the restoring force of its deformed portions. While the bush 46 is attached to the outer container 4, only tops of the ribs 46A are in contact with the ribs 16A and 16B, lower portion 16, and reflection plate 8. In the above description, a plurality of (in the above example, six) ribs 46A are provided. However, not limited to this, any number of ribs (at least one rib) 46A may be provided. The reason why the ribs 46A are formed will be described later.

Each fluorescent lamp 6 is supported at the folded portion 34 by a folded portion supporting member 62 that is attached to the upper portion 14, as shown in FIGS. 1 and 2A. The folded portion supporting member 62 is made of a PET resin. The folded portion supporting member 62 has a portion that is in the shape of character "C" in the cross section, and the glass bulb 32 (folded portion 34), which is circular in the cross section, is fit into the C-shaped portion of the folded portion supporting member 62, as shown in FIG. 2A. The folded portion 34 is firmly supported by the elastic deformation of the C-shaped portion.

A reflection sheet 64 and a heat insulating sheet 66 are inserted between the folded portion supporting member 62 and the folded portion 34. The reflection sheet 64 reflects light from the folded portion 34 in a direction in which the straight portions 110 and 112 of the glass bulb 32 extend, that is to say, it reflects light downward. With this construction, it is possible to indirectly extract the light from the folded portion 34, which cannot be directly extracted due to the presence of the attachment frame 22, out the backlight unit. This contributes to the improvement in brightness of the backlight unit. The heat insulating sheet 66, disposed between the folded portion 34 and the folded portion supporting member 62, literally plays a role of a heat insulating member. As the material of the heat insulating member, Teflon (trademark) may be used. However, not limited to this, any material that is lower in heat conductivity than a gas filling the backlight unit, namely, the air may be used. The reason why the heat insulating member (heat insulating sheet 66) is provided will be described later. The heat insulating sheet 66 and the reflection sheet 64 are stuck to the folded portion supporting member 62 as one unit.

As described above, in the backlight unit 2 in which, when it is erected vertically, the electrodes 44 of the curved fluorescent lamps 6 are positioned low and the folded portions 34 are positioned high (hereinafter, the backlight unit is referred to as a curved-tube vertical-mounted type), the unevenness of brightness of the overall backlight unit (the brightness on the surface of the translucent plate 12) has been improved compared with conventional backlight units.

The following describes the reason why the uneven brightness is caused by a backlight unit, and the reason why the uneven brightness is improved in the backlight unit of the present embodiment, with reference to FIGS. 3A, 3B, 4A and 4B.

Figure 3A:
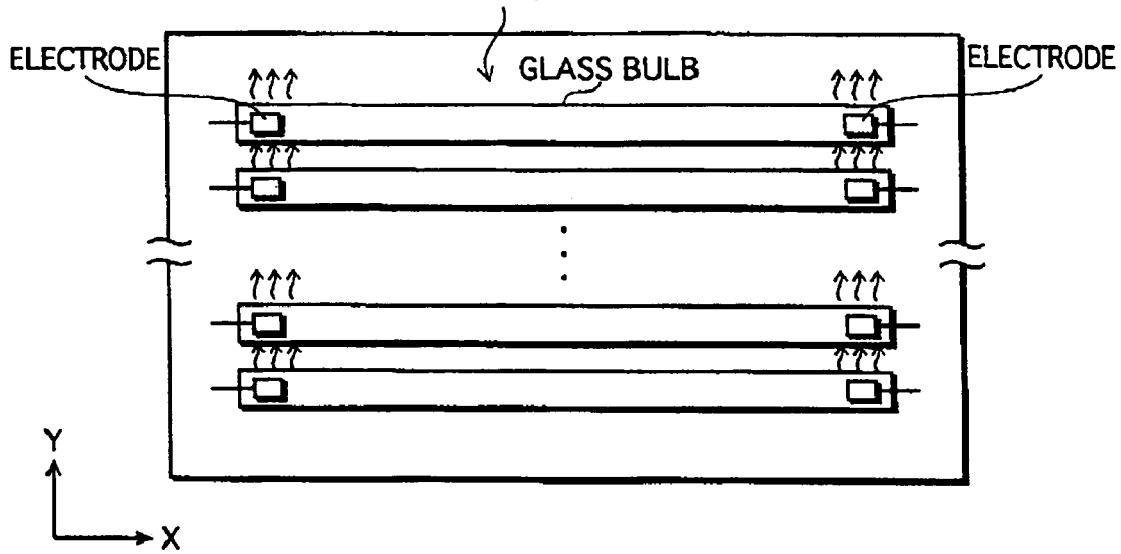
FIGS. 3A and 3B show conventional, fluorescent lamp transverse-mounted type backlight units.
Figure 3B:
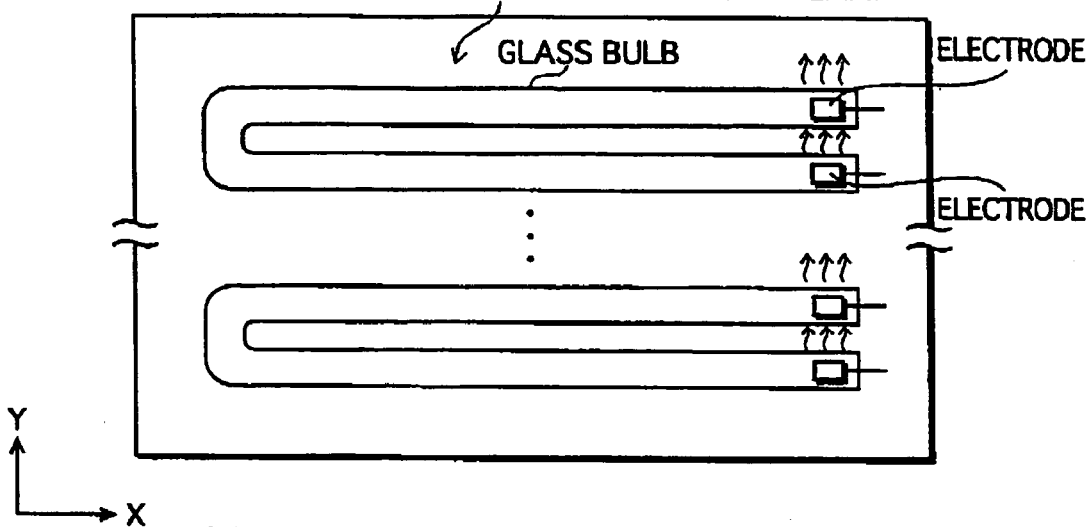

FIGS. 3A and 3B show transverse-mounted type backlight units. In the fluorescent lamps, heat is generated by plasma and the electrodes. The heat generated by the electrodes causes the temperature to rise higher than the heat generated by plasma. The heat generated by the electrodes is diffused upward. In the transverse-mounted type, the heat generated by the electrodes is diffused outside the glass bulb via the glass bulb, as indicated by the three arrows for each electrode shown in FIGS. 3A and 3B, and heats the air in the backlight unit. Accordingly, most of the heat generated by the electrodes is used to heat the air in the backlight unit. This causes the temperature in the backlight unit to increase excessively, and causes unevenness in temperature in the backlight unit. When this happens, the fluorescent lamps, which are laid horizontally and aligned in the vertical direction, have different degrees of brightness, which is observed as an uneven brightness in the overall backlight unit. Also, although detailed data is omitted here, the inventors of the present application have found that in terms of the curved fluorescent lamps laid horizontally, a difference in brightness occurs not only between a plurality of lamps but between the upper straight portion and the lower straight portion in a fluorescent lamp.

Figure 4A:
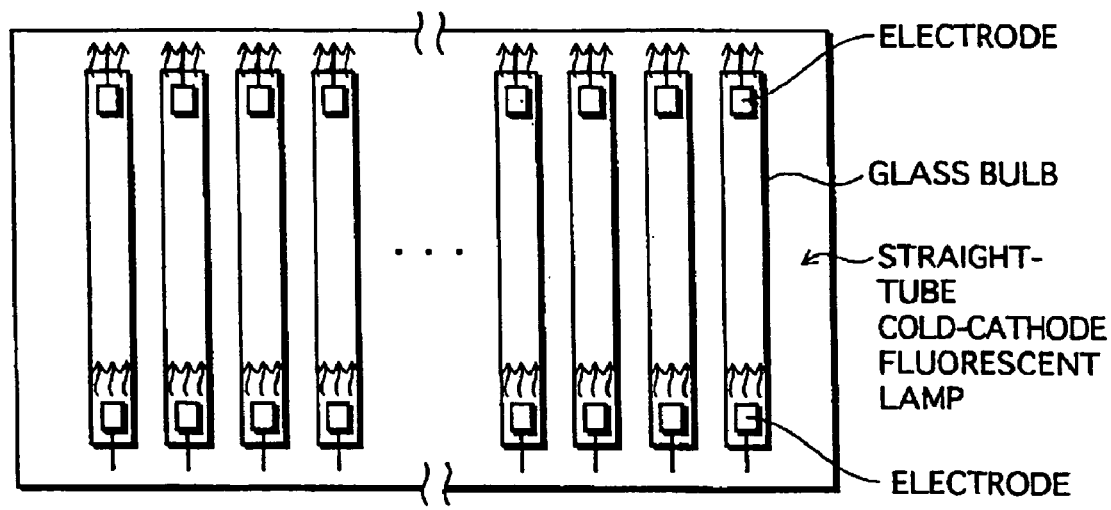
FIG. 4A shows a conventional, straight-tube vertical-mounted type backlight unit.

In the case of the straight-tube vertical-mounted type as shown in FIG. 4A, most of the heat generated by the lower electrode moves upward in the glass bulb and heats the glass bulb and the gas filled in the glass bulb, and most of the heat generated by the upper electrode is diffused outside the glass bulb and heats the air in the backlight unit. As a result, as is the case with the transverse-mounted type, an uneven temperature in the backlight unit is caused, which causes a difference in brightness between the upper portion and the lower portion of each fluorescent lamp, causing an uneven brightness in the overall backlight unit.

Figure 4B:
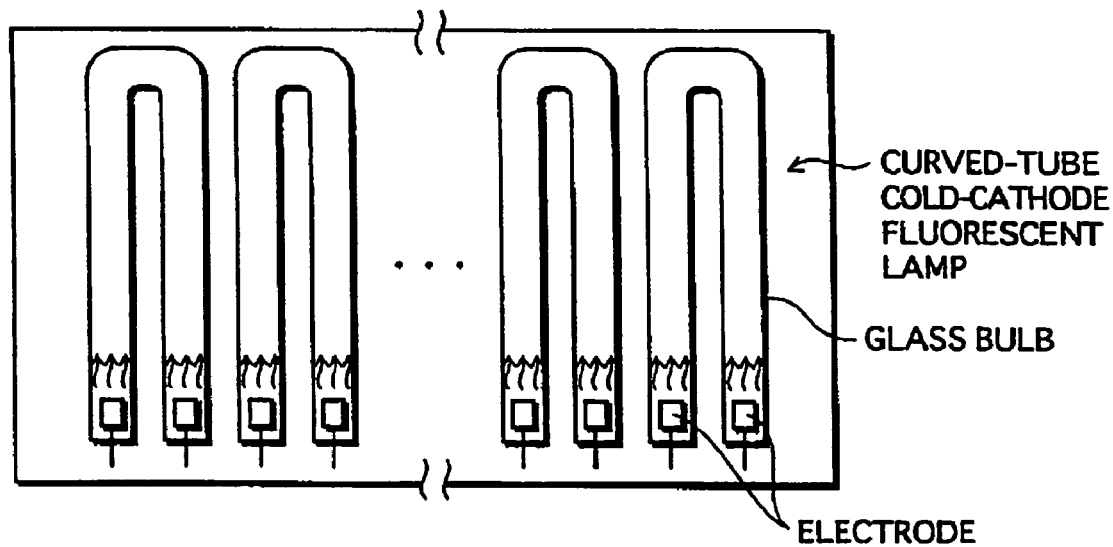
FIG. 4B shows a curved-tube vertical-mounted type backlight unit in the embodiment of the present invention.

In contrast to the above-explained backlight units, in the curved-tube vertical-mounted type shown in FIG. 4B, the heat generated by the electrodes moves upward in the glass bulb and is used to heat the glass bulb and the gas filled in the glass bulb. That is to say, the curved-tube vertical-mounted type can restrict the increase of temperature in the backlight unit better than any of the conventional types: straight-tube transverse-mounted type; curved-tube transverse-mounted type; and straight-tube vertical-mounted type. This results in reduction of not only the amount of difference between fluorescent lamps, but the amount of difference between portions of a fluorescent lamp. Accordingly, the curved-tube vertical-mounted type backlight unit, in which the fluorescent lamps are arranged as shown in FIG. 4B can restrict the uneven brightness in the overall backlight unit better than conventional ones.

The inventors of the present application found through an experiment (referred to as the first experiment) that the curved-tube vertical-mounted type has less amount of difference in brightness between portions of a fluorescent lamp than conventional ones. The inventors of the present application also conducted another independent experiment (referred to as the second experiment) to measure the temperature on the surface of the glass bulb of the fluorescent lamp when the fluorescent lamp was set vertically in a wide space, not in the backlight unit.

Of these, the second experiment will be explained first.

Figure 5:
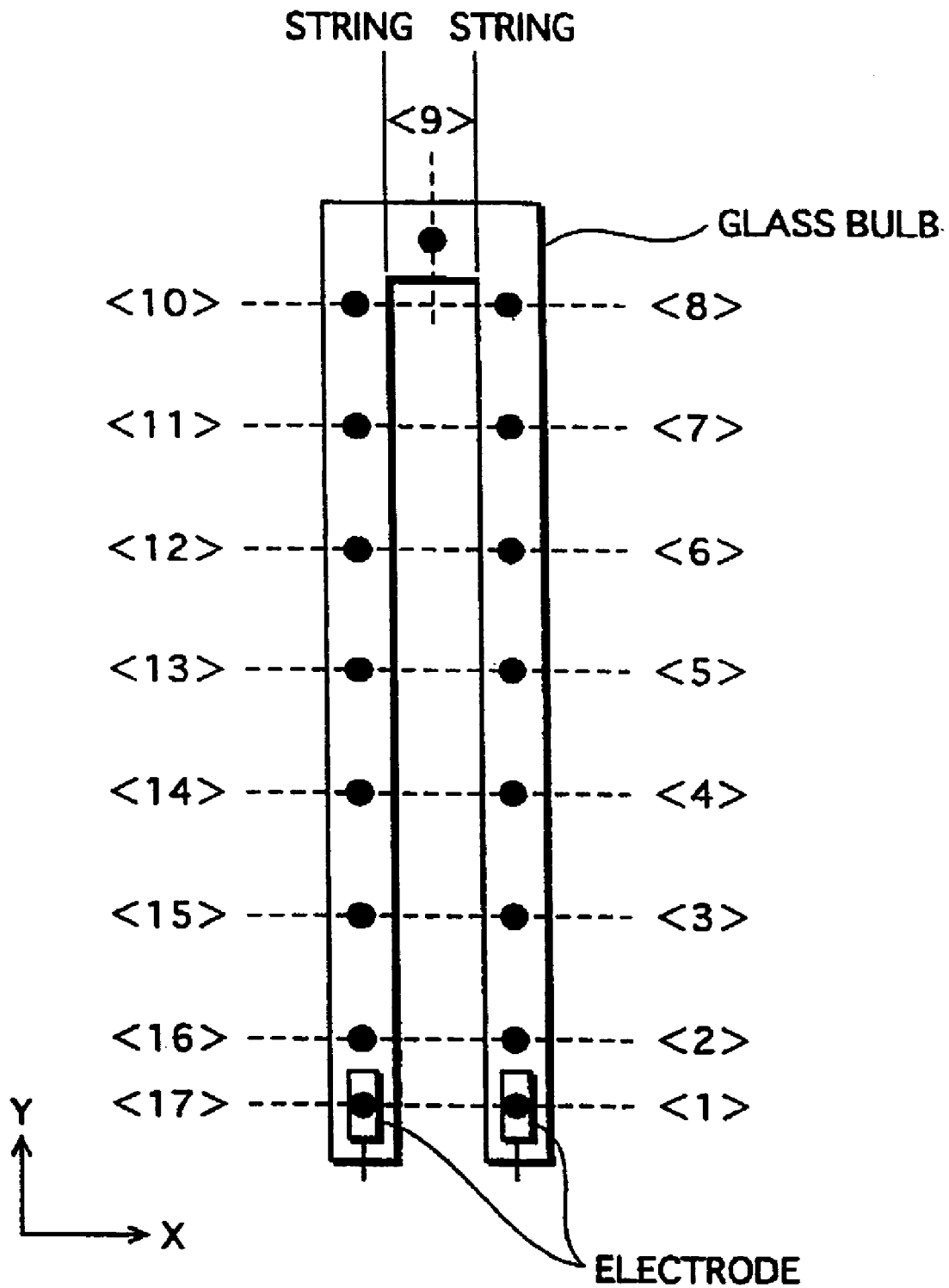
FIG. 5 shows an experiment model of a glass bulb surface temperature measurement experiment.

FIG. 5 shows an experiment model of the second experiment. As shown in FIG. 5, a curved cold-cathode fluorescent lamp is hung vertically with pieces of string attached to the folded portion thereof. Then the lamp is lighted and the temperature was measured at measurement points <1> to <17>. FIG. 6 shows positions of the measurement points.

The measurement positions shown in FIG. 6 are represented by the distances (mm) from the bottom of the glass bulb along the Y-axis direction. The experiment was conducted with the ambient temperature set to 25±1° C.

FIG. 7 shows the experiment results.

As shown in FIG. 7, there is hardly a difference in temperature among measurement points <2> to <8> and <10> to <16> of the straight portions, excluding the measurement points <1> and <17> that are the positions of the electrodes. It is only natural since the lamp is lighted in a wide space, not in a narrow space such as in the backlight unit. Also, it is found from FIG. 7 that the folded portion (measurement point <9>) is lower than any other measurement positions in temperature.

FIG. 8 shows results of the first experiment.

In the first experiment, as is the case with the second experiment, a curved cold-cathode fluorescent lamp was hung vertically with pieces of string attached to the folded portion thereof, but in the backlight unit. As understood from FIG. 8, the temperature of the straight portions (measurement points <2> to <8> and <10> to <16>) rose by approximately 10° C. compared with the case of the second experiment. This indicates that although the temperature in the backlight unit rises less in the curved-tube vertical-mounted type, the temperature rises nonetheless by an amount that is small enough to prevent the uneven brightness from occurring. It is observed however that there is hardly a difference in temperature and thus brightness among the measurement points <2> to <8> and <10> to <16>, which align in the vertical direction, of the straight portions. As shown in FIG. 8, it is found that although there is hardly a difference in temperature among the measurement points aligning in the vertical direction in the backlight unit, the heat that moves upward in the backlight unit stays partially at the top inside the backlight unit. This is why the temperature of the folded portion rose by approximately 20° C., which is higher by approximately 10° C. than the temperature rise in the case of the second experiment. This results in the evenness in temperature at all the measurement points <2> to <16>, excluding the measurement points <1> and <17> corresponding to the electrodes.

As described above, in the second experiment, the coldest point is observed at the folded portion (measurement point <9>) as shown in FIG. 7, and since the coldest point is far below the proper temperature, the optimum mercury vapor pressure is not obtained. In contrast, in the first experiment, the folded portion (measurement point <9>) is approximately the same in temperature as the other positions of the straight portions (<2> to <8> and <10> to <16>). This is an improvement in relation to obtainment of the optimum mercury vapor pressure.

Meanwhile, in conventional curved-tube transverse-mounted type backlight units, the folded portion is supported as shown in FIG. 2A. With this method, however, the heat at the folded portion escapes through the supporting member, and decreasing the temperature there to the coldest point, preventing the optimum mercury vapor pressure from being obtained. This is why in the above-described embodiment, a heat insulating member (the heat insulating sheet 66—see FIG. 2A) is inserted between the folded portion supporting member 62 and the glass bulb 32 to prevent the temperature at the folded portion from decreasing.

Also, the reason why the ribs 46A are formed on the bush 46 is as follows. The curved-tube vertical-mounted type provides, as described above, an advantageous effect that the heat generated by the electrodes is diffused into the space inside the backlight unit by an amount that is smaller than the amount of heat generated in any other types of backlight units. In addition to this, the curved-tube vertical-mounted type provides an advantageous effect that the heat generated by the electrodes heats the filling gas to an extent that the mercury vapor pressure is increased to the optimum pressure. That is to say, the heat generated by the electrodes is positively used to heat the filling gas, thereby obtaining the optimum mercury vapor pressure with a small amount of power. The ribs 46A formed on the bush 46 also support this. That is to say, the ribs 46A decrease the contact area between the bush 46 and the side plate 10 (the lower portion 16) and the ribs 16A and 16B of the lower portion 16, which reduces the amount of heat that escapes from the electrodes to the outer container 4. This construction increases the percentage of the heat that contributes to heating the filling gas, among the heat generated by the electrodes.

Also, if the above-described purer spectral color fluorescent substances are used as the fluorescent substances that constitute the fluorescent substance film, it is possible to obtain a desired level of brightness without increasing excessively the amount of power to be supplied to the fluorescent lamps. The purer spectral color fluorescent substances have advantageous effect of extending the NTSC triangle in the chromaticity diagram, but provide lower degrees of brightness than the other types of fluorescent substances. Accordingly, in order for the purer spectral color fluorescent substances to obtain the same level of brightness as the other types of fluorescent substances, the amount of power to be supplied to the fluorescent lamps needs to be increased as much. In contrast, according to the present embodiment, as described above, it requires only a small amount of power to obtain the optimum mercury vapor pressure. The present embodiment therefore enables a desired level of brightness without increasing excessively the amount of power to be supplied to the fluorescent lamps.

The measurement of the backlight unit 2 and the fluorescent lamps 6 is as follows, for example. The backlight unit of the present invention can be used as a component of a liquid crystal television with a 14 to 52-inch screen. In that case, the number of fluorescent lamps contained in the backlight unit is 6 to 20 for aspect ratio "4:3", and 6 to 23 for aspect ratio "16:9". Also, an overall length L1 of the fluorescent lamp, which is indicated in FIG. 1, is 130 to 600 mm. A length W1 of the folded portion (namely, a distance between the straight portions 36 and 38) is preferably 15 to 35 mm. The reason why the lower limit of the range is set to 15 mm is that with a length shorter than this, it is difficult to stably fold a glass tube in the manufacturing process. The reason why the upper limit of the range is set to 35 mm is that if the folded portion is longer than this, mercury that has gathered at the center of the folded portion diffuses to the straight portions only by a small amount. When this happens, the brightness at the straight portions of the fluorescent lamps 6 is decreased. Accordingly, the optimum range of the folded portion length W1 for stably folding the glass tube and preventing the brightness from decreasing is represented as "W1=15 to 35 mm".

The above-described embodiment of the present invention can be modified as follows, for example.

Modification 1

Figure 9A:
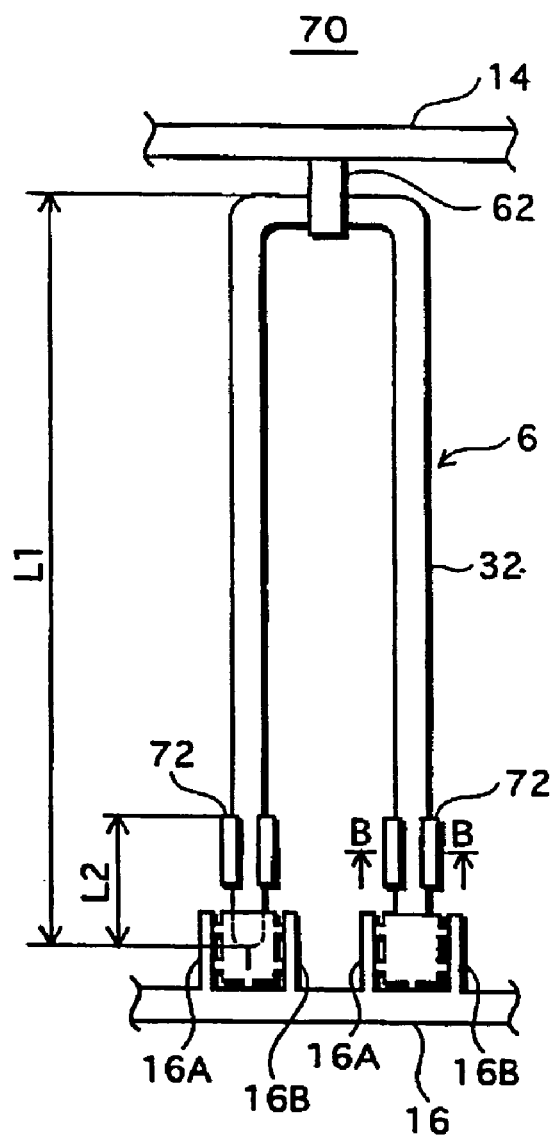
FIGS. 9A-9C show parts of the backlight unit in Modification 1.
Figure 9C:
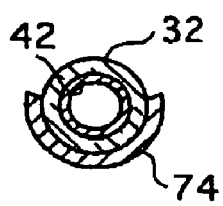
Figure 9B:
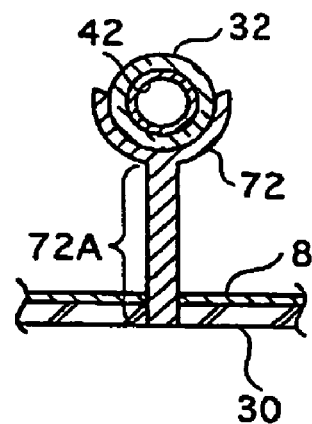

FIG. 9A is a partial plan view of a backlight unit 70 in Modification 1. FIG. 9B is an enlarged sectional view taken substantially along line B-B of FIG. 9A.

The backlight unit 70 in Modification 1 basically has the same construction as the backlight unit 2 in the above-described embodiment, except that it additionally includes heat releasing members 72. Accordingly, the members of the backlight unit 70 that have the same constructions as those of the backlight unit 2 are assigned the same reference numbers, and the description thereof is omitted here. The following description centers on the heat releasing members 72.

The heat releasing members 72 literally play a role of heat releasing members, and effectively release part of the heat that is generated by the fluorescent lamps 6, from the fluorescent lamps 6. The heat releasing members 72 also function as supporting members that support the fluorescent lamps 6 in the backlight unit, as shown in FIG. 9B.

Each heat releasing member 72 is made of a white PET resin, and is in the shape of character "C" in the cross section, with a side thereof facing the translucent plate 12 (see FIG. 2A) being open. Each heat releasing member 72 is attached so that its inner surface is in contact with the outer surface of the glass bulb 32. The heat releasing members 72 draw heat from and cool surface portions of the glass bulbs 32 with which they are in contact. The heat releasing members 72 are provided for the purposes of forming the coldest points stably near the electrodes, increasing the mercury distribution density near the electrodes, and extending the length of life of the electrodes and fluorescent lamps.

To achieve the above-described purposes of the heat releasing members 72, it is preferable that each heat releasing member 72 is attached at a position between the lower end of the glass bulb 32 and the center in length of the straight portion of the glass bulb 32 (the position can be indicated by a distance L2 in the Y direction between the lower end of the glass bulb 32 and the upper end of the heat releasing member 72), as shown in FIG. 9A. The position of the heat releasing member 72 is represented in relation to an overall lamp length L1 as: "L2≦(L1)/2". It is more preferable that the heat releasing member 72 is attached at a position represented as "L2≦(L1)/3", and further more preferable that the heat releasing member 72 is attached at a position within 50 mm from the upper end of the electrode.

The main purpose of the heat releasing members is, as described above, to release heat. The heat releasing members therefore may not be used to support glass bulbs, as the heat releasing members 72. For example, the heat releasing members may be heat releasing members 74 shown in FIG. 9C that are a remainder of the heat releasing members 72 after feet 72A are removed therefrom.

Also, the material of the heat releasing members is not limited to the PET resin, but may be, for example, half transparent silicon. That is to say, the heat releasing members may be made of any material that is higher in heat conductivity than a gas (the air) filling the backlight unit.

Modification 2

Figure 10:
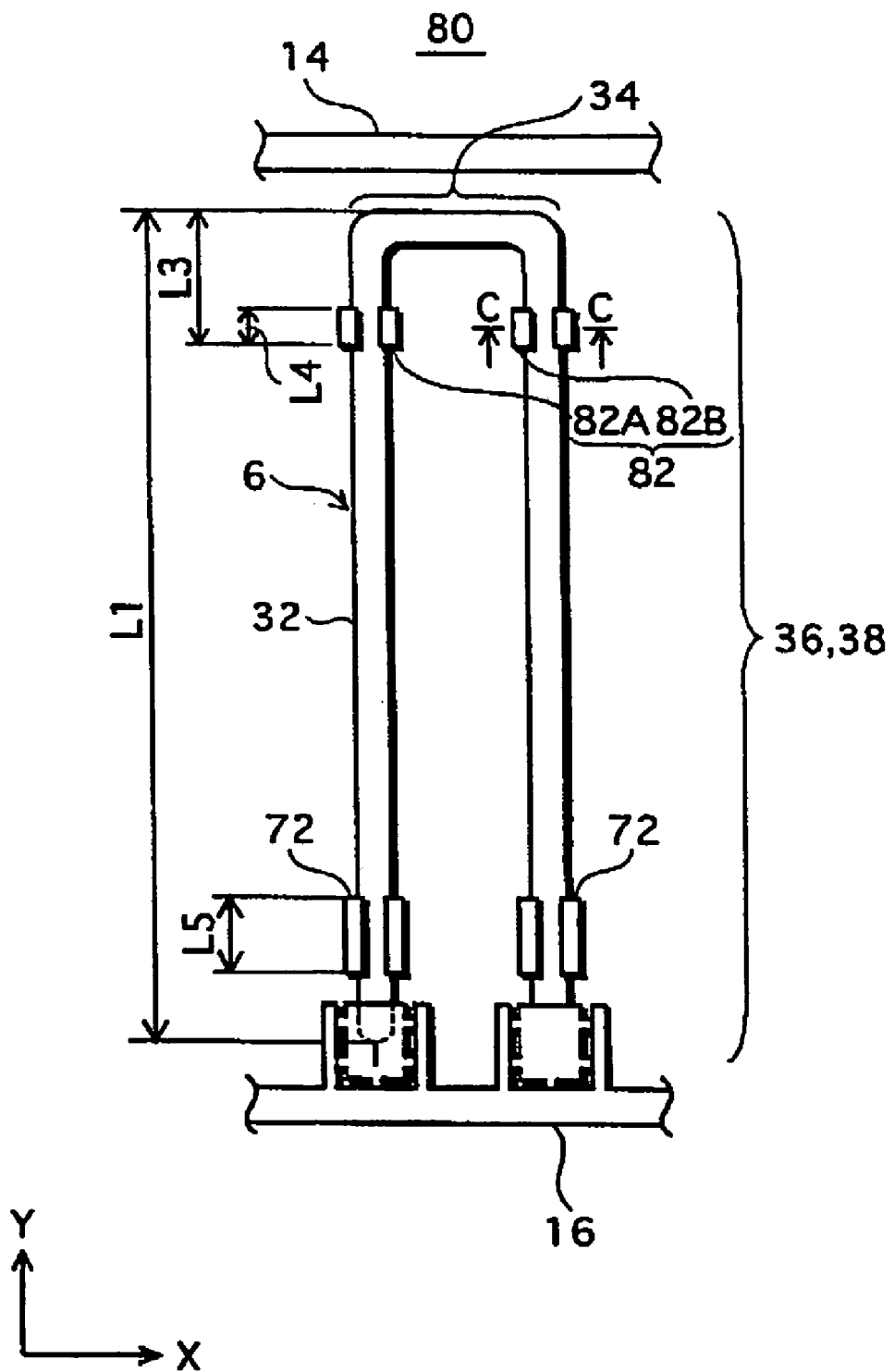
FIG. 10 shows part of the backlight unit in Modification 2.

FIG. 10 is a partial plan view of a backlight unit 80 in Modification 2. The backlight unit 80 in Modification 2 basically has the same construction as the backlight unit 70 in Modification 1, except that it includes, instead of the a folded portion supporting member 62 (see FIG. 9A), straight-portion supporting members 82 which are each composed of a pair of supporting members 82A and 82B. Accordingly, the members of the backlight unit 80 that have the same constructions as those of the backlight unit 70 are assigned the same reference numbers, and the description thereof is omitted here. The following description centers on the differences.

As described above, in the backlight unit 80, the folded portion 34 is indirectly supported as the straight portions 36 and 38 are supported by the straight-portion supporting members 82. With this construction, compared with the case in which the folded portion 34 is directly supported by the folded portion supporting member 62, the accuracy in positioning the fluorescent lamp 6 in the horizontal direction is improved. The supporting members 82A and 82B are in the same shape. An enlarged sectional view of the supporting members taken substantially along line C-C of FIG. 10 is similar to the enlarged sectional view of the heat releasing members 72 shown in FIG. 9B. The straight-portion supporting members 82 are made of the same material as the heat releasing members 72: a white PET resin. Here, it is preferable that each straight-portion supporting member 82 is attached at a position between the folded portion 34 and the center in length of the straight portion of the glass bulb 32 (the position can be indicated by a distance L3 in the Y direction between the upper end of the glass bulb 32 and the lower end of the straight-portion supporting member 82), as shown in FIG. 10. This is because the straight-portion supporting members 82 are provided for the purpose of supporting the upper portions of the fluorescent lamps 6. The position of the straight-portion supporting members 82 is represented in relation to the overall lamp length L1 as: "L3≦(L1)/2".

Heat escapes from the fluorescent lamps 6 via the straight-portion supporting members 82, to some extent. It is accordingly necessary to prevent the coldest point from being formed at portions of the fluorescent lamps 6 that are in contact with the straight-portion supporting members 82. For this necessity, in modification 2, a length L4 of the supporting members 82A and 82B in the vertical direction (the Y direction) is set to be shorter than a length L5 of the heat releasing members 72 in the vertical direction (the Y direction). That is to say, a difference is made between the straight-portion supporting members 82 and the heat releasing members 72 in the contact area with the glass bulb 32 so that among the heat generated by the fluorescent lamps 6 while they are lighted, a more amount of heat escapes through the heat releasing members 72 than through the straight-portion supporting members 82. In the above-described example, the straight-portion supporting members 82 and the heat releasing members 72 are made of the same material (PET resin). However, these members may be made of different materials when they are in the same shape. For example, the straight-portion supporting members 82 may be made of acrylic resin, and at the same time, the heat releasing members 72 may be made of half transparent silicon that is higher than the acrylic resin in heat conductivity.

Filling Gas

The inventors of the present application succeeded to develop a cold-cathode fluorescent lamp with improved lamp efficiency and starting voltage compared with conventional ones, by contriving the composition of a mix gas that is filled in the glass bulb. The following will describe the composition of the mix gas and the process of the development.

As described earlier, the glass bulb of the cold-cathode fluorescent lamp is filled with a rare gas and a small amount of mercury. The rare gas is enclosed mainly for the purpose of decreasing the sparkover voltage. Conventionally, only argon was enclosed as the rare gas.

However, as the LCD apparatus including the backlight unit was more and more compact, the demand for more compact power unit for driving the cold-cathode fluorescent lamp was increased. And therefore, further reduction of the sparkover voltage was required. To meet the demand, a cold-cathode fluorescent lamp that is filled mainly with neon and argon as the rare gas was developed.

Figure 11A:
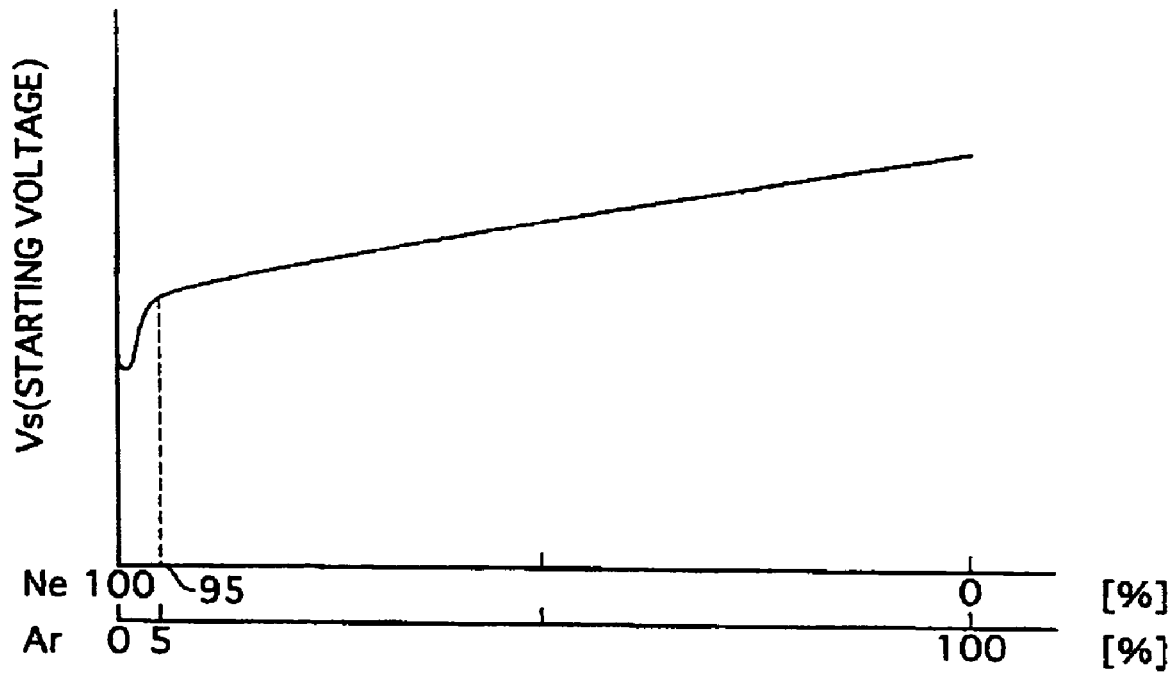
FIGS. 11A and 11B are plots of data for a cold-cathode fluorescent lamp that is filled with a mix gas of mainly neon and argon, where

The inventors of the present invention also performed an experiment regarding the starting voltage characteristics with varying molar ratio between enclosed neon and argon. FIG. 11A shows the results of the experiment. FIG. 11A is a plot of the molar ratio (%) between neon (Ne) and argon (Ar) to the right and the starting voltage vertically. It should be noted here that FIG. 11A only shows the tendency of the change of the starting voltage in correspondence with the mix ratio of rare gases, and does not show absolute values, for example.

As shown in FIG. 11A, as the ratio of neon is increased starting with only argon (100%) (that is, as the ratio of argon is decreased), the starting voltage gradually decreases. It is understood from FIG. 11A that to improve only the starting voltage, it is preferable that the rare gas to be enclosed is close to only neon (100%).

Figure 11B:
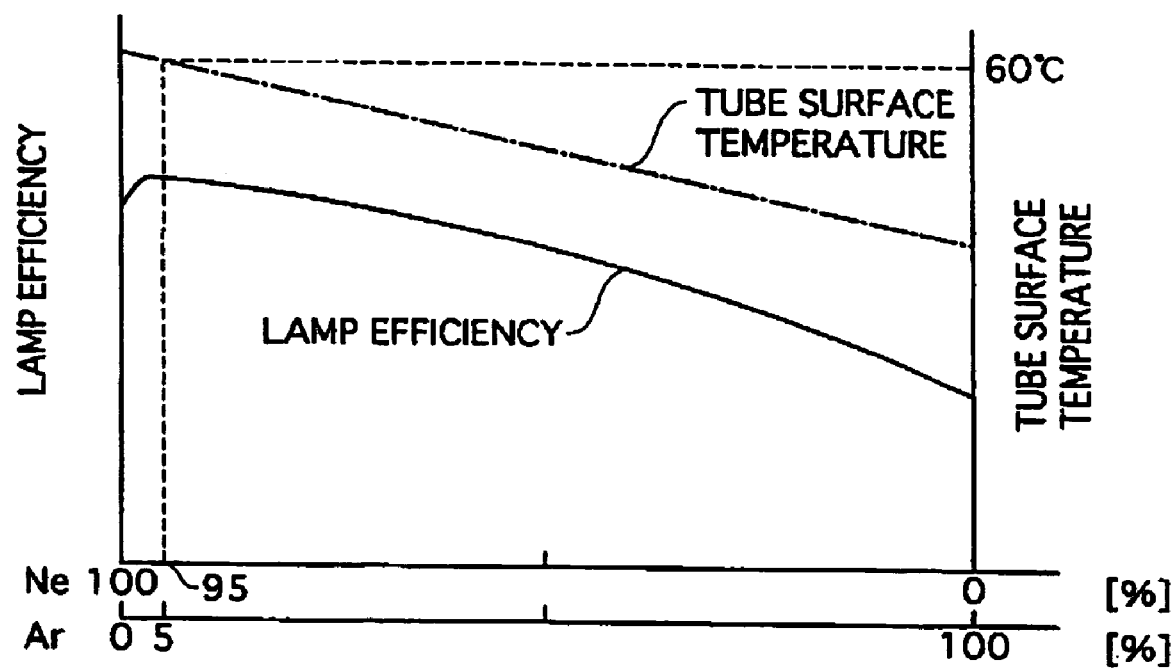

It has been confirmed through experiment however that if the rare gas to be enclosed is close to only neon (100%), the lamp efficiency is decreased. FIG. 11B is a plot of the mix ratio between neon and argon to the right and the lamp efficiency vertically. As understood from FIG. 11B, as the ratio of argon is decreased, the lamp efficiency gradually increases to a peak when argon 3-10% (neon 90-97%) and then decreases. This is because when the mix ratio is neon 90-97% and argon 3-10%, the glass bulb surface temperature (Ts) becomes 60° C. at which the optimum mercury vapor pressure is obtained.

The optimum mix ratio is therefore considered to be neon 90-97%-argon 3-10%, since with the mix ratio, compared with the case of only argon, the starting voltage is improved and the lamp efficiency is improved.

Meanwhile, as the liquid crystal televisions become larger in scale and higher in brightness, the number of cold-cathode fluorescent lamps attached to each backlight unit of the direct-below type attached to a LCD panel for such liquid crystal televisions increases. As the number of cold-cathode fluorescent lamps increases, the temperature in the unit also rises up to near 70° C., exceeding 60° C. at which the optimum mercury vapor pressure is obtained. This results in reduction of the lamp efficiency to a level at which necessary brightness cannot be obtained.

To prevent the lamp efficiency from being reduced due to the increase of temperature in the unit, the ratio of argon may be increased to be more than 5% to decrease the glass bulb surface temperature. It is possible with this arrangement to decrease the temperature in the unit to near 60° C. However, as understood from FIG. 11A, this causes the starting voltage to increase. Such a high starting voltage becomes a problem for a range of temperatures at which the liquid crystal television is used, especially at a low temperature (for example, 0° C.) at which the mercury vapor pressure becomes low.

The inventors of the present application have conducted various experiments to develop a cold-cathode fluorescent lamp that has been improved in both the lamp efficiency and the starting voltage (especially, the starting voltage at a low temperature), compared with a fluorescent lamp for which a mix rare gas of mainly neon and argon is used.

Figure 12A:
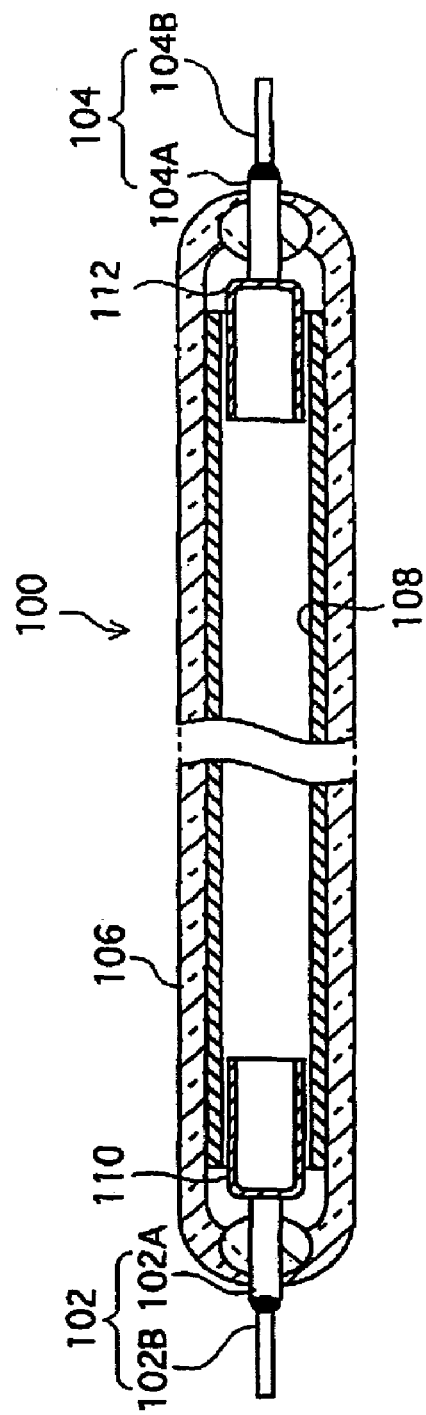
FIGS. 12A and 12B are longitudinal cross-sectional views of the cold-cathode fluorescent lamp that was used in the experiment.

FIG. 12A is a longitudinal cross-sectional view taken along the length of a cold-cathode fluorescent lamp 100 (hereinafter, referred to merely as a lamp 100) that was subjected to the experiment, showing an outline construction thereof. It should be noted here that although the experiment was conducted using a straight-tube type lamp, the results of the experiment may be applied to a curved-tube type lamp.

The lamp 100 includes a glass bulb 106 that is approximately circular in the transverse cross section and is hermetically sealed by lead wires 102 and 104 at both ends. The glass bulb 106 is made of hard borosilicate glass, with its overall length being 450 mm, the outer diameter 4.0 mm, and the inner diameter 3.0 mm.

On the inner surface of the glass bulb 106, a fluorescent film 108 is formed. The fluorescent film 108 includes three rare-earth fluorescent substances: red fluorescent substance $[Y_2O_3:Eu^{3+}]$; green fluorescent substance $[LaPO_4:Ce^{3+}, Tb^{3+}]$; and blue fluorescent substance $[BaMg_2Al_{16}O_{27}:Eu^{2+}]$.

The glass bulb 106 is filled with mercury (not illustrated) of approximately 3 mg and a mix gas of a plurality of rare gases. The gases contained in the mix gas and the mix ratio will be described in detail later.

The lead wire 102 is formed by linking an inner lead wire 102A made of tungsten with an outer lead wire 102B made of nickel, and the lead wire 104 is formed by linking an inner lead wire 104A made of tungsten with an outer lead wire 104B made of nickel. The glass bulb is hermetically sealed by the inner lead wires 102A and 104A at both ends. The inner lead wires 102A and 104A and the outer lead wires 102B and 104B are circular in the transverse cross section, respectively. The inner lead wires 102A and 104A are 1 mm in the diameter, with their overall length being 3 mm, respectively. The outer lead wires 102B and 104B are 0.8 mm in the diameter, with their overall length being 10 mm, respectively.

The inner lead wires 102A and 104A are supported by the ends of the glass bulb 106, respectively. Electrode 110 is joined by, for example, laser welding, with an end of the inner lead wire 102A located inside the glass bulb 106. Electrode 112 is joined by, for example, laser welding, with an end of the inner lead wire 102A located inside the glass bulb 106. The electrodes 110 and 112 are what is called hollow type which is in the shape of a cylinder with a bottom. The electrodes 110 and 112 are made of niobium bars.

Figure 12B:
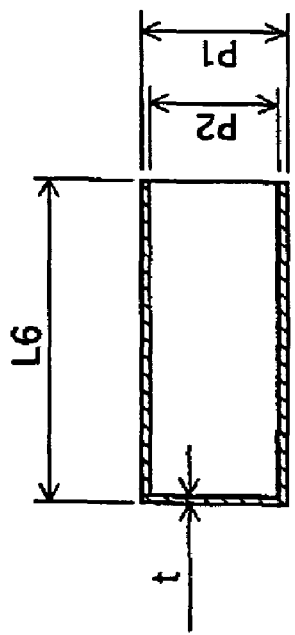

The electrodes 110 and 112 are in the same shape. The measurement of the portions shown in FIG. 12B is as follows: An electrode length L2=5.2 mm; an outer diameter p2=2.7 mm; and thickness t1=0.2 mm (inner diameter p3=2.3 mm). The electrodes 110 and 112 are disposed so that the center thereof is the tube axis of the glass bulb 106. It is understood from the above-described measurement that the distance between the outer surface of the electrodes 110 and 112 and the inner surface of the glass bulb 106 is approximately 0.15 mm. Such a small distance is set to prevent the lamp current from flowing into the space between the outer surface of the electrodes 110 and 112 and the inner surface of the glass bulb 106. In other words, with this arrangement, when the lamp is lighted, discharge occurs only inside the hollow electrodes 110 and 112 (occurs at the inner side and bottom surfaces of the cylinder-shaped electrodes).

The inventors of the present invention conducted an experiment for the above-constructed cold-cathode fluorescent lamp in terms of the starting voltage or the like, for comparing each of the samples with mix gases of neon (Ne)+argon (Ar)+krypton (Kr) and neon (Ne)+krypton (Kr) with a conventional mix gas of neon (Ne)+argon (Ar) that are enclosed in the glass bulb. The following describes the experiment conditions and results for each mix gas.

[1] Neon (Ne)+Argon (Ar)+Krypton (Kr)

An experiment was conducted in terms of the starting voltage for comparing the mix gas of neon (Ne)+argon (Ar)+krypton (Kr) (hereinafter referred to as "type B") with the conventional mix gas of neon (Ne) 95% and argon (Ar) 5% (hereinafter referred to as "type A"). It should be noted here that in the present embodiment, the mix ratio (%) of the mix gas is represented by a molar ratio. Regarding the type B, five types of different mix ratios using the three rare gases were prepared. The five types are identified by the signs B-1, B-2, B-5. Detailed mix ratios will be described later.

For each of the type A and the types B-1 to B-5, five samples for each of the gas pressure 40 Torr (5320 Pa), 50 Torr (6650 Pa), and 60 Torr (7980 Pa) were prepared. The starting voltage was measured for each sample at ambient temperature 0° C. and at ambient temperature 25° C.

FIGS. 13-18 show the measurement results.

Figure 19:
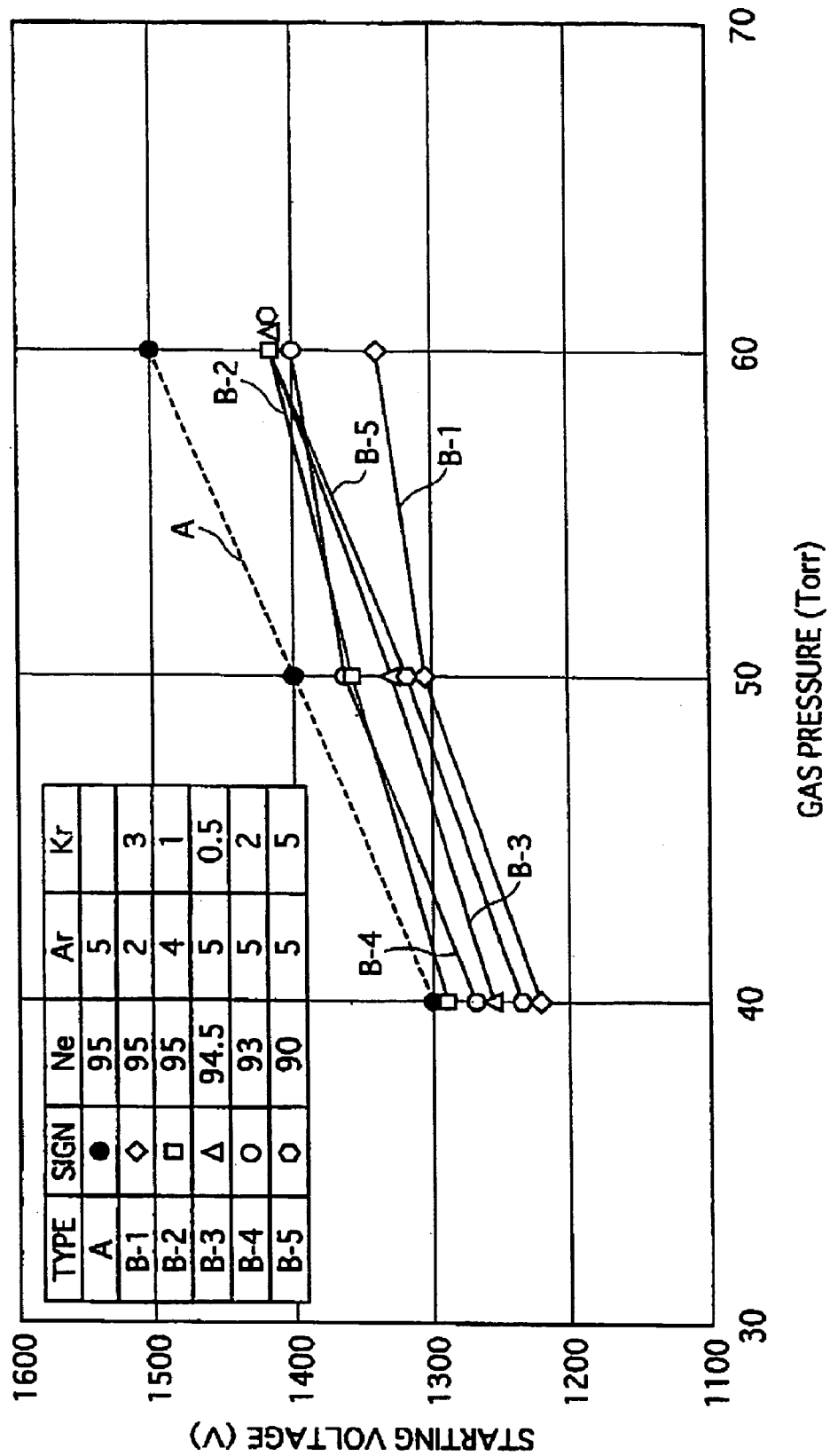
FIG. 19 is a plot of gas pressure versus starting voltage at ambient temperature 0° C. for various types of rare gases with various mix ratios.

FIG. 19 is a graph that was made based on the data of the experiment results for the ambient temperature 0° C. shown in FIGS. 13-18. The mix ratios of the types B-1 to B-5 are shown in the upper left corner of FIG. 19. It should be noted here that in FIG. 19, the arithmetic average of the five measurement results values (No. 1-5) is used for the sake of convenience, instead of showing all the five values.

As shown in FIG. 19, in an environment of the ambient temperature 0° C. and any of the gas pressures, the starting voltage of the lamps of types B-1 to B-5 is lower than that of the conventional type-A lamp. That is to say, it was found that the starting voltage at a low temperature (0° C.) is decreased when a mix gas of neon, argon and krypton, which is made by adding krypton to the conventional type-A mix gas of neon and argon, is used.

Figure 20:
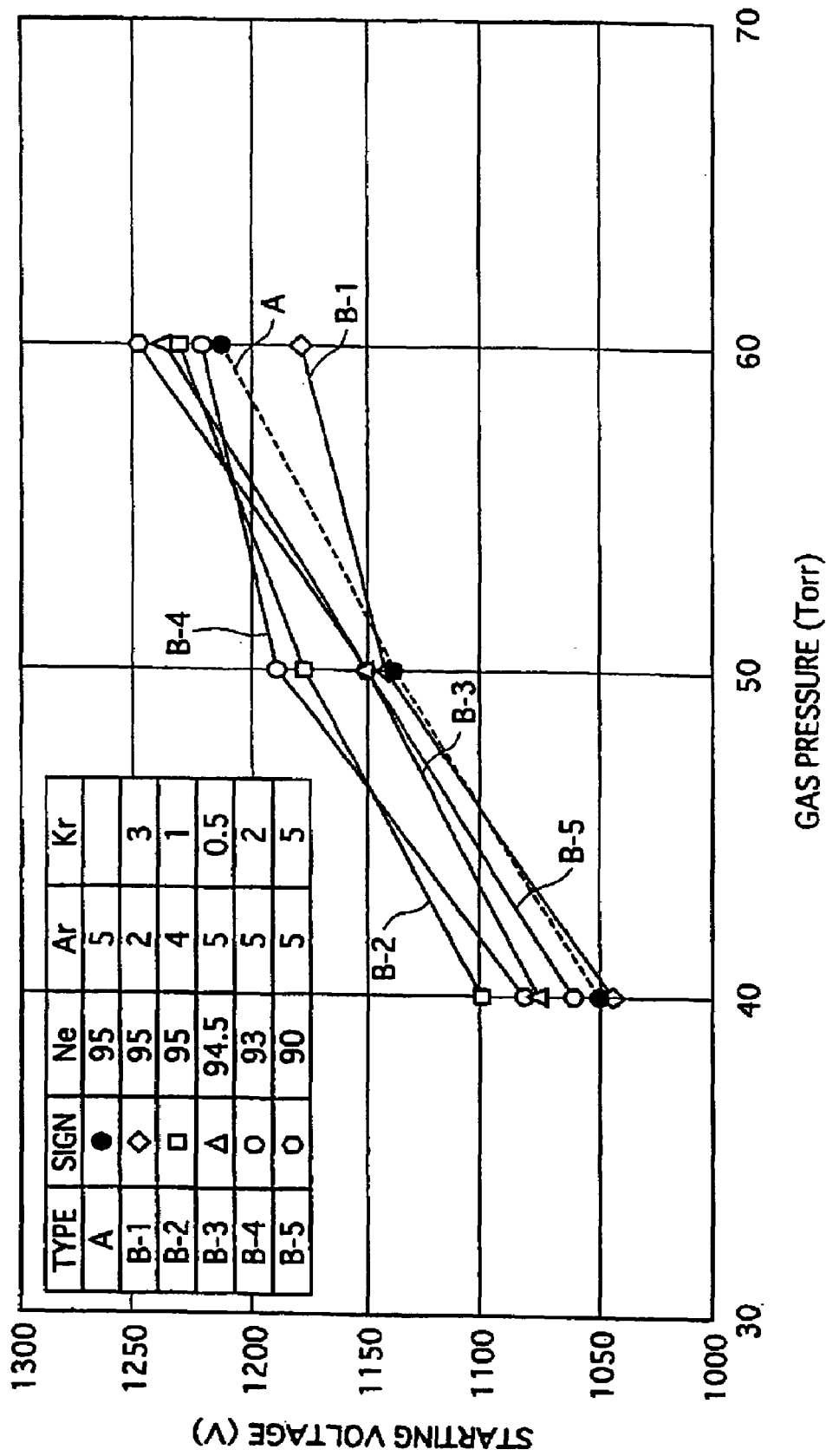
FIG. 20 is a plot of gas pressure versus starting voltage at ambient temperature 25° C. for various types of rare gases with various mix ratios.

FIG. 20 is a graph that was made based on the data of the experiment results for the ambient temperature 25° C. shown in FIGS. 13-18.

As shown in FIG. 20, except for 60 Torr of gas pressure at which the starting voltage of the type-B-1 lamp is lower than that of the conventional type-A lamp, the starting voltage of the type-B lamps is equal to or higher than that of the conventional type-A lamp. However, the starting voltage of the type-B lamps is approximately 1250 V at the highest, which is of the type-B-5 lamp at 60 Torr of gas pressure. The value 1250 V is lower than the approximate 1300 V that is the lowest starting voltage of the conventional type-A lamp at the ambient temperature 0° C. (see FIG. 19). That is to say, it was found that use of the type-B mix gas improves the starting voltage in terms of the operation of the liquid crystal display apparatus at the severest temperature environment. This contributes to achievement of a small-scale power circuit.

[2] Neon (Ne)+Krypton (Kr)

An experiment was conducted in terms of the starting voltage for comparing the mix gas of neon (Ne) 95%+ krypton (Kr) 5% (hereinafter referred to as "type C") with the conventional type-A mix gas. The experiment was conducted under the same conditions as the above-described experiment for type-B mix gas.

FIG. 21 shows the measurement results of this experiment.

Figure 22:
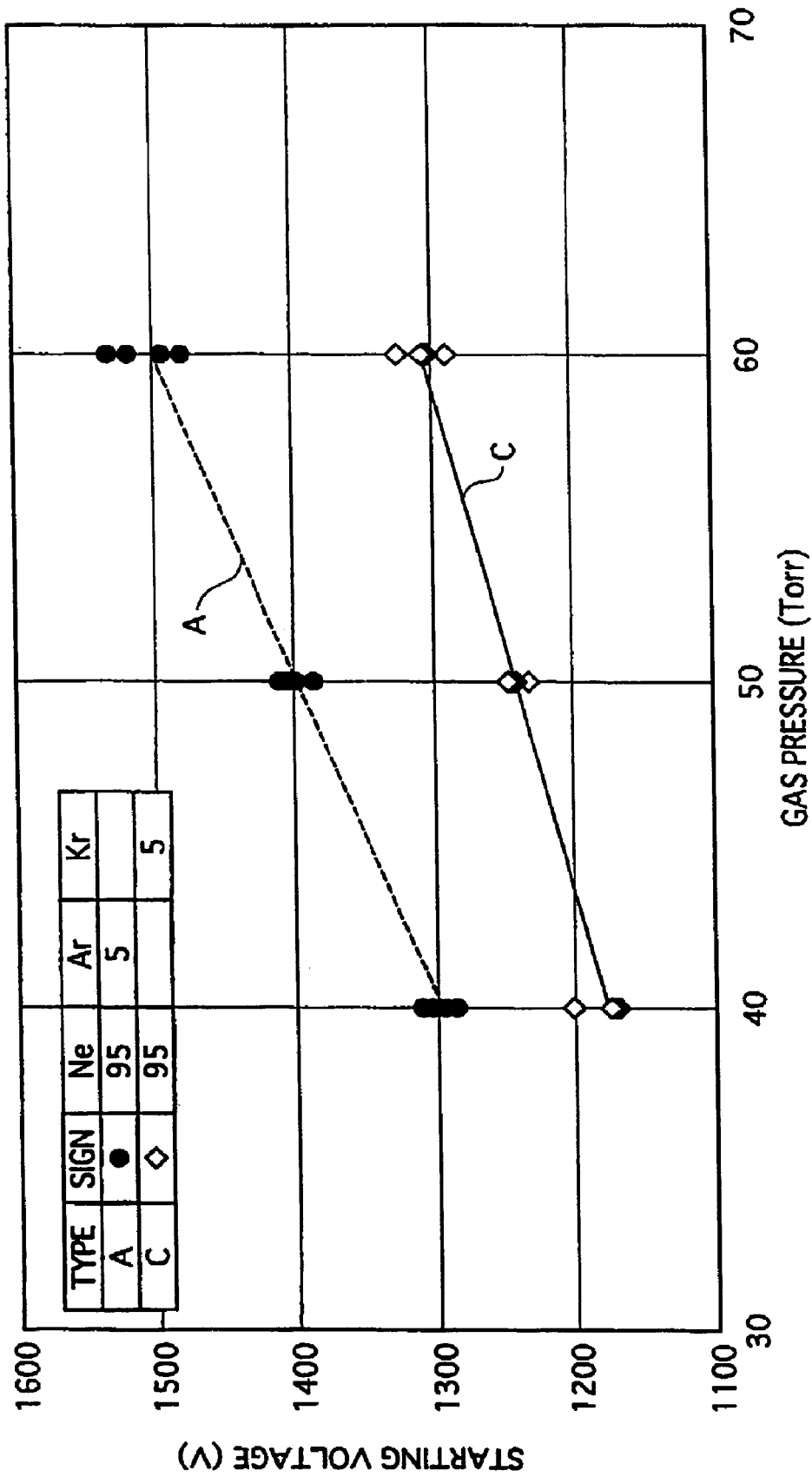
FIG. 22 is a plot of gas pressure versus starting voltage at ambient temperature 0° C. for various types of rare gases with various mix ratios.
Figure 23:
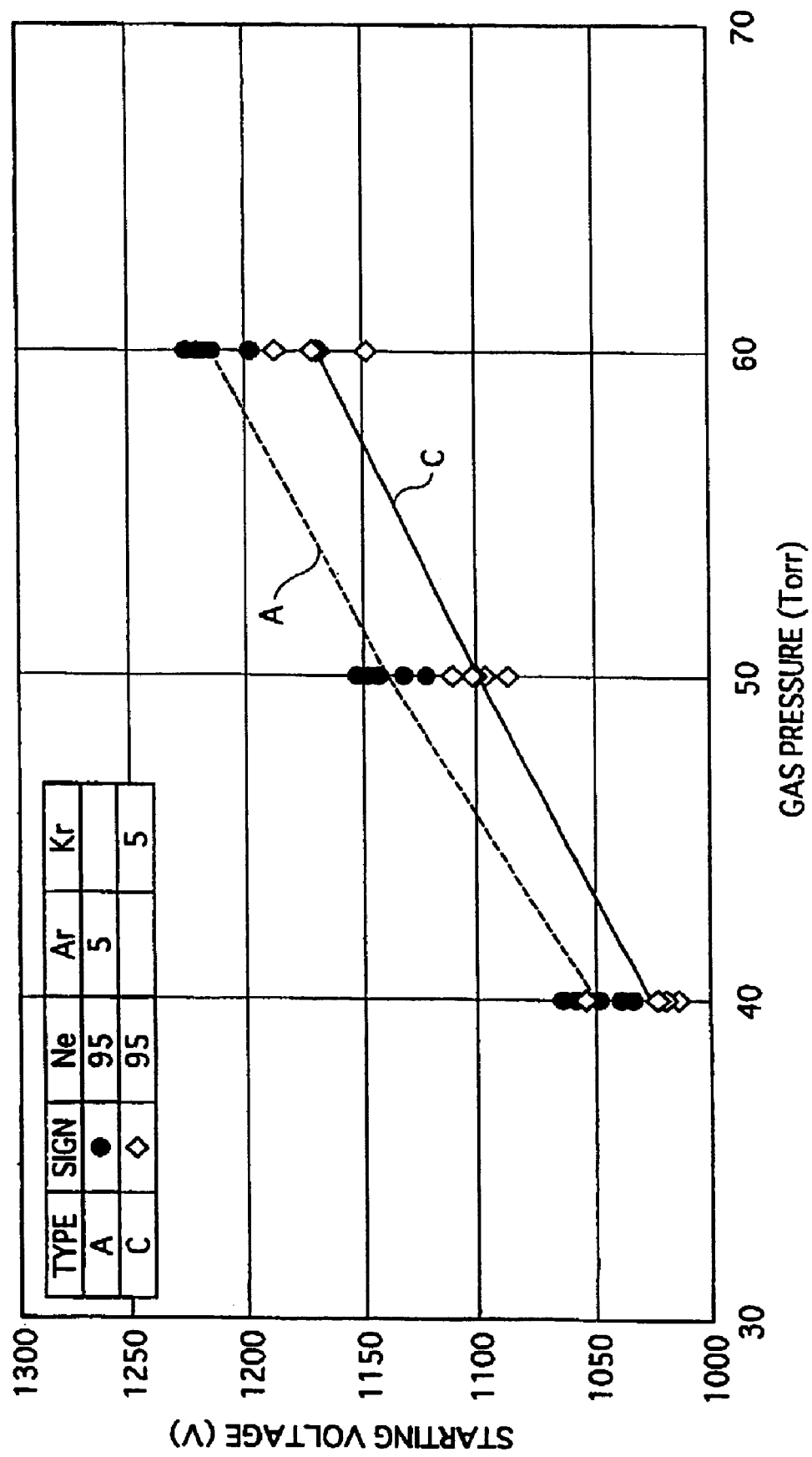
FIG. 23 is a plot of gas pressure versus starting voltage at ambient temperature 25° C. for various types of rare gases with various mix ratios.

FIG. 22 is a graph that was made based on the data of the starting voltage measurement results for the ambient temperature 0° C. shown in FIGS. 13 and 21. FIG. 23 is a graph that was made based on the data of the starting voltage measurement results for the ambient temperature 25° C. shown in FIGS. 13 and 21. It should be noted here that in FIGS. 22 and 23, all the five values of the measurement results (No. 1-5) are shown.

As shown in FIGS. 22 and 23, the starting voltage of the type-C lamp is lower than that of the conventional type-A lamp in any of the conditions (ambient temperatures, gas pressures). This indicates that the starting voltage is improved (lowered) by using the mix gas of neon and krypton instead of the mix gas of neon and argon.

[3] Lamp Efficiency

The inventors of the present invention also conducted an experiment for comparing, in terms of the lamp efficiency (1 m/W) the conventional type-A lamp with type-B and type-C lamps at varying ambient temperatures (° C.). Detailed data of the ambient temperatures and the lamp efficiency is omitted here, but only the tendency of the relationship between the types is shown in FIG. 24.

Figure 24:
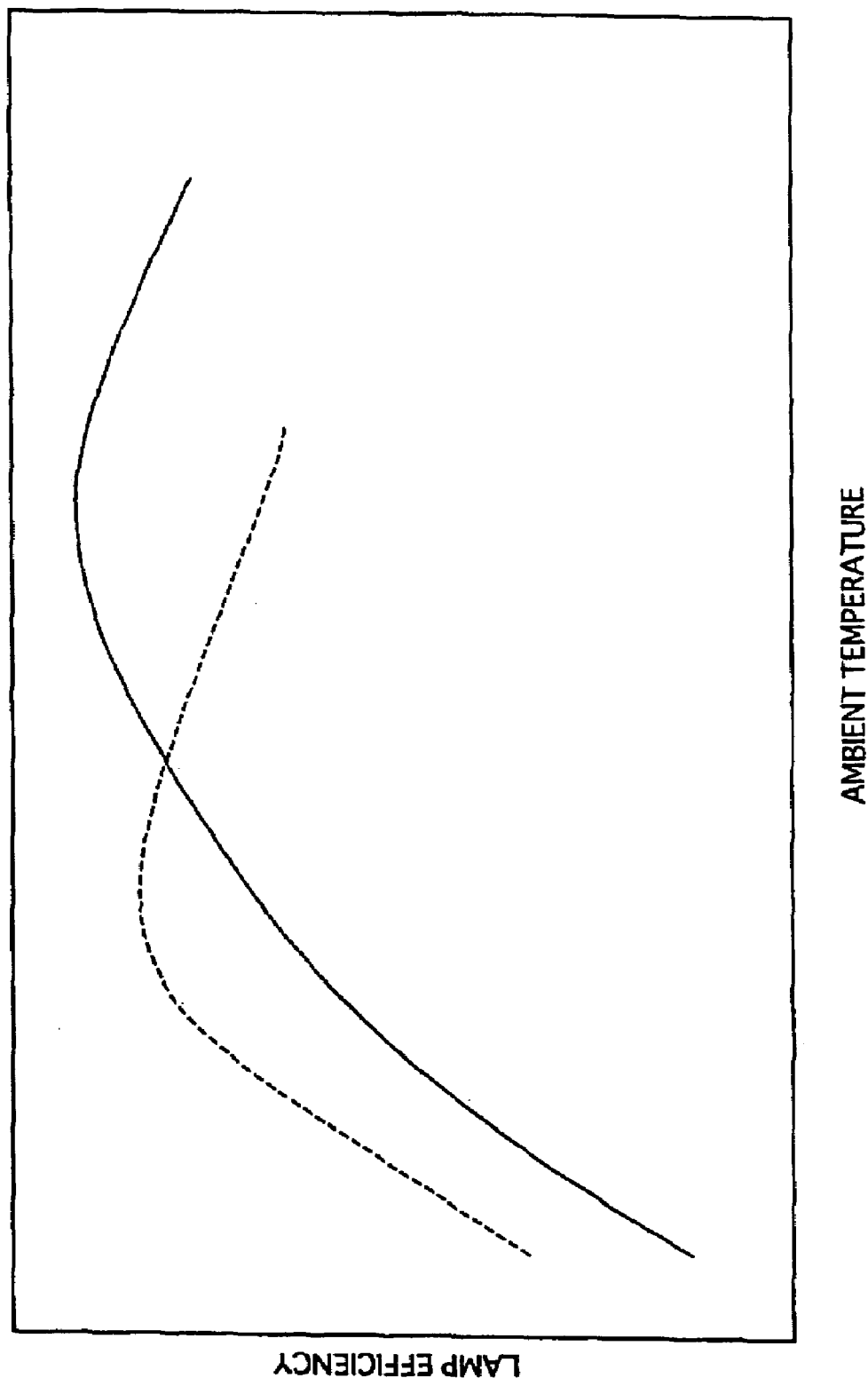
FIG. 24 is a plot of ambient temperature versus lamp efficiency.

FIG. 24 is a plot between the ambient temperature to the right and the lamp efficiency vertically. In FIG. 24, the dotted line indicates the type-A lamp and the solid line indicates the type-B and type-C lamps.

There is an optimum temperature for each of the type-A lamp and type-B, C lamp at which it takes the largest value of the lamp efficiency. The optimum temperature for the type A is approximately 60° C., and the optimum temperature for the type B, C is approximately 70° C. Also, as shown in FIG. 24, the largest value of the lamp efficiency of the type B, C is somewhat higher than that of the type A.

In the recent trend, the LCD apparatuses are becoming large, and the number of lights used in the backlight units of the direct-below type are also increasing. As a result, when a backlight unit is lighted, the temperature inside the backlight unit rises to approximately 70° C. This indicates that the conventional type-A lamp cannot take the largest value of the lamp efficiency during the lighting because it takes the largest value of the lamp efficiency at around 60° C., and that in contrast, the type-B, C lamp takes the largest value of the lamp efficiency when the backlight unit is lighted and has reached the highest temperature inside.

As described above, the cold-cathode fluorescent lamp of the present invention has a lower starting voltage at around 0° C. than conventional ones using the mix gas of mainly neon and argon. This contributes to the reduction in size of the power unit or the like. Furthermore, the highest lamp efficiency is obtained at the temperature inside the unit in which the cold-cathode fluorescent lamp of the present invention is disposed.

The following describes an example case where the backlight unit 2 (see FIGS. 1, 2A and 2B) is used in a liquid crystal display apparatus for a liquid crystal television.

FIG. 25 is a cutaway view of a liquid crystal television 200 in which a front part has been cut away. The liquid crystal television 200 shown in FIG. 25 is, for example, a 32-inch liquid crystal television, and includes a liquid crystal display panel 202 and the backlight unit 2. It should be noted here that the inverter 204 shown in FIG. 25 is a component of the backlight unit 2.

The liquid crystal display panel 202 includes a color filter substrate, a liquid crystal, and a TFT substrate. The liquid crystal display panel 202 is driven by a drive module (not illustrated) in accordance with an image signal received from outside, and forms a color image.

The backlight unit 2 is disposed at the back of the liquid crystal display panel 202, and emits light toward the liquid crystal display panel 202. As shown in FIG. 25, the flat outer container 4, which constitutes the backlight unit 2, is erected vertically in use. In the outer container 4, when it is erected vertically in use, the fluorescent lamps 6 are arranged so that the electrodes 44 are at low positions and the folded portion 34 is at a high position in the outer container (see FIG. 1).

The inverter 204 supplies high-frequency power to each fluorescent lamp 6 (see FIG. 1) that constitutes the backlight unit 2 to cause each fluorescent lamp 6 to emit light. The inverter 204 is disposed in a space outside the outer container 4 and inside a case 206 of the liquid crystal television 200. When the liquid crystal television 200 is operated and each fluorescent lamp 6 of the backlight unit 2 emits light, the inverter 204 becomes a heat source that reaches considerably a high point in temperature. If such a heat source is disposed in the outer container 4, the unevenness in temperature in the outer container 4 is enhanced. And this enhances the unevenness in brightness in the overall backlight unit 2. It is therefore preferable that the container 4 includes such meaningless heat sources as few as possible. This is the reason why the inverter 204 is disposed outside the outer container 4.

Up to now, the present invention has been described in the form of an embodiment. However, not limited to such embodiments, the present invention may be achieved in the following forms, for example.

(1) In the above-described embodiment, the fluorescent lamps 6 are arranged to align horizontally, with the two straight portions in each lamp aligning horizontally, as shown in FIG. 1. However, not limited to this, the fluorescent lamps 6 may be arranged, for example, to align horizontally, with the two straight portions in each lamp aligning in a direction perpendicular to the plane of the paper in FIG. 1. In the above-described embodiment, hollow-type electrodes in the shape of a cylinder with a bottom are used as the electrodes (cold cathode) of the cold-cathode fluorescent lamps. However, the shape of the electrodes is not limited to that of the hollow-type electrodes. There may be no need to use hollow-type electrodes, especially when the lamp is lighted by a low electric current. For example, the electrodes may be shaped like a cylinder or a rectangular plate. Also, the electrodes may be made of nickel, molybdenum, or tantalum, other than niobium. Meanwhile, the regulations are restricting the amount of mercury for use due to concern about the environmental problems. When niobium, molybdenum, or tantalum is used as the material of the electrodes, the consumption of the electrodes is reduced, compared with the case where nickel is used as the material. It is therefore preferable to use such materials since it extends the lamp life with a small amount of mercury.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A backlight unit for providing illumination brightness at a constant temperature comprising:
an outer container having an operative upper vertical frame portion and an operative lower vertical frame portion;
a curved fluorescent lamp that is contained in the outer container and includes two electrodes and a glass bulb that has (1) a folded portion and (ii) two straight portions that extend in parallel with each other from the folded portion, and the two electrodes being respectively attached to two ends of the glass bulb; and
an inverter operable to supply power for lighting to the curved fluorescent lamp, wherein
the inverter is disposed outside the outer container, and
the curved fluorescent lamp is arranged so that the electrodes are at low positions adjacent the lower frame portion and the folded portion is at a high position in the outer container adjacent the upper frame portion for operation of the backlight unit wherein heat generated by the electrodes rises within the outer container towards the folded portion to maintain a substantially constant temperature along the folded portion and the two straight portions.

2. The backlight unit of claim 1 further comprising:
a folded portion supporting member that supports the folded portion within the outer container; and
a heat insulating member that is inserted between the folded portion and the folded portion supporting member.

3. The backlight unit of claim 2 further comprising
a reflection member that is attached to the heat insulating member, and reflects light from the folded portion in a direction in which the straight portions extend.

4. The backlight unit of claim 1 further comprising
a pair of heat releasing members that are respectively attached-to outer surfaces of the glass bulb at positions between the two ends and centers in length of the straight portions, the heat releasing members being made of a material that is higher in heat conductivity than a gas filling the outer container.

5. The backlight unit of claim 1 further comprising:
a pair of straight-portion supporting members that respectively support the straight portions at positions between the folded portion and centers in length of the straight portions in the container; and.
a pair of heat releasing members that are respectively attached to outer surfaces of the glass bulb at positions between the two ends and centers in length of the straight portions so that the heat releasing members release heat generated by the curved fluorescent lamp during lighting that is larger in amount than heat that escapes through the straight-portion supporting members.

6. A liquid crystal display apparatus comprising
a liquid crystal display panel; and
the backlight unit defined in claim 1, wherein
the outer container is disposed on a back surface of the liquid crystal display panel.

7. A backlight unit comprising:
an outer container shaped in the form of a flat rectangular box having an operative upper vertical frame portion and an operative lower vertical frame portion;
a curved fluorescent lamp that is contained in the outer container and includes two electrodes and a glass bulb that has (1) a folded portion and (ii) two straight portions that extend from the folded portion substantially in parallel with the short sides of the outer container, and the two electrodes being respectively attached to two ends of the glass bulb; and
an inverter operable to supply power for lighting to the curved fluorescent lamp, wherein
the inverter is disposed outside the outer container, and
the curved fluorescent lamp is arranged so that the electrodes are at low positions adjacent the lower frame portion and the folded portion is at a high position in the outer container adjacent the upper frame portion for operation of the backlight unit, wherein heat generated by the electrodes rises within the outer container towards the folded portion to maintain a substantially constant temperature along the folded portion and the two straight portions to provide a uniform brightness across the backlight unit.

* * * * *